US012785485B2

(12) United States Patent
Taira et al.

(10) Patent No.: US 12,785,485 B2
(45) **Date of Patent: *Nov. 3, 2026**

(54) MAGNETIZING DEVICE AND MAGNETIZING METHOD

(71) Applicant: HONDA MOTOR CO., LTD., Tokyo (JP)

(72) Inventors: Tokio Taira, Wako (JP); Shinji Nemoto, Wako (JP); Toshitaka Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 254 days.

This patent is subject to a terminal disclaimer.

(21) Appl. No.: 18/439,779

(22) Filed: Feb. 13, 2024

(65) Prior Publication Data

US 2024/0291338 A1 Aug. 29, 2024

(30) Foreign Application Priority Data

Feb. 24, 2023 (JP) ................................. 2023-027095

(51) Int. Cl.
*H02K 3/28* (2006.01)
*H02K 1/12* (2006.01)
*H02K 1/278* (2022.01)

(52) U.S. Cl.
CPC ................. *H02K 3/28* (2013.01); *H02K 1/12* (2013.01); *H02K 1/278* (2013.01)

(58) Field of Classification Search
CPC ............ H02K 1/276; H02K 1/12; H02K 1/26; H02K 3/04; H02K 3/28; H02K 15/03; H02K 15/038
See application file for complete search history.

(56) References Cited

U.S. PATENT DOCUMENTS

| | | | | |
|---|---|---|---|---|
| 5,424,902 A * | 6/1995 | Shida | H02K 15/03 | 361/147 |
| 5,491,393 A * | 2/1996 | Uesugi | H02K 29/12 | 318/807 |

(Continued)

FOREIGN PATENT DOCUMENTS

| | | | |
|---|---|---|---|
| CN | 111313576 A * | 6/2020 | H02K 1/148 |
| EP | 2924850 A1 * | 9/2015 | H02K 3/16 |

(Continued)

OTHER PUBLICATIONS

U.S. Appl. No. 18/439,779, filed Nov. 15, 2025_CN_111313576_A_H.pdf (Year: 2025).*

(Continued)

*Primary Examiner* — Christopher M Koehler
*Assistant Examiner* — Ahmed F Seck
(74) *Attorney, Agent, or Firm* — Amin, Turocy & Watson, LLP

(57) ABSTRACT

In a magnetizing device and a magnetizing method, by an auxiliary coil applying an auxiliary magnetic field to a rotor, among a plurality of magnetic bodies, in the case it is assumed that an auxiliary magnetic field is not present therein, a diametrical inwardly directed magnetic flux caused by the auxiliary magnetic field is made to pass with respect to a magnetic body for which there is a possibility of the magnetic body being magnetized in a direction opposite to a direction in which the magnetic body should be magnetized due to the passage of a leakage magnetic flux.

9 Claims, 15 Drawing Sheets

(56) References Cited

U.S. PATENT DOCUMENTS

| | | | | | |
|---|---|---|---|---|---|
| 6,154,352 | A * | 11/2000 | Atallah | H02K 15/03 | 361/143 |
| 6,272,729 | B1 * | 8/2001 | Reznik | H02K 99/20 | 29/598 |
| 2011/0221552 | A1 * | 9/2011 | Rochford | H01F 6/06 | 62/51.1 |
| 2016/0079833 | A1 * | 3/2016 | Okada | H02K 15/03 | 29/598 |
| 2023/0318381 | A1 * | 10/2023 | Ishikawa | H02K 21/14 | 310/208 |
| 2025/0343448 | A1 * | 11/2025 | Nashiki | H02P 25/022 | |

FOREIGN PATENT DOCUMENTS

| | | | | |
|---|---|---|---|---|
| JP | H0617370 | U * | 3/1994 | |
| JP | 2005-224055 | | 8/2005 | |
| KR | 20100111112 | A * | 10/2010 | H02K 1/27 |

OTHER PUBLICATIONS

U.S. Appl. No. 18/439,779, filed Nov. 15, 2025_EP_2924850_A1_H.pdf (Year: 2025).*
U.S. Appl. No. 18/439,779, filed Nov. 15, 2025_JP_H0617370_U_H.pdf (Year: 2025).*
U.S. Appl. No. 18/439,779, filed Nov. 15, 2025_KR_20100111112_A_H.pdf (Year: 2025).*

* cited by examiner

MAGNETIZING DEVICE AND MAGNETIZING METHOD

CROSS-REFERENCE TO RELATED APPLICATIONS

This application is based upon and claims the benefit of priority from Japanese Patent Application No. 2023-027095 filed on Feb. 24, 2023, the contents of which are incorporated herein by reference.

BACKGROUND OF THE INVENTION

Field of the Invention

The present invention relates to a magnetizing device and a magnetizing method.

Description of the Related Art

In recent years, efforts directed toward realizing a low-carbon or a decarbonized society have become more active. In respect to vehicles as well, research and development in relation to electrification technology are also being conducted in order to reduce $CO_2$ emissions and to improve energy efficiency. For this reason, electric vehicles, which do not emit greenhouse gases and are superior in terms of environmental performance, are attracting attention. An electric vehicle is equipped with a high-output motor as a drive source. In addition, electrification of aircraft and work equipment is being promoted, and in the field of general-purpose equipment, replacement of engines with motors is being promoted.

Among such motors, a PM motor having permanent magnets in its rotor is said to be superior in efficiency and environmental performance. The rotor used for such a motor has a magnetization process for magnetizing the permanent magnets at the final stage of the manufacturing process.

For example, JP 2005-224055 A discloses a magnetizing device and a magnetizing method for multipole permanent magnets arranged alongside one another in a rotor.

SUMMARY OF THE INVENTION

In order to reduce the size and increase the output of the motor, research aimed at reducing the diameter and increasing the rotational speed of the motor is advancing to contribute to the improvement in energy efficiency. A high-rotation type motor may have a scattering prevention sleeve circumferentially around the rotor in order to prevent deformation of the rotor and to prevent scattering of the magnets due to centrifugal force. In this case, an air gap between the stator and the rotor is widened, resulting in that the magnetization is affected. In addition, the rotor structure is changing because of the appearance of an SPM type motor, in which the magnets are arranged outside of the rotor, an attempt to produce a higher output with a Halbach arrangement of the magnets, an improvement in the performance of the magnets, and an increase in the number of poles. A rotor having a smaller diameter and a greater number of poles leads to a smaller magnetic circuit for magnetizing the permanent magnets, and causes a problem in that the magnetic flux hardly reaches the inside of the permanent magnets. Further, the improvement in the performance of the magnets increases the magnetic field intensity required to magnetize the magnets, and requires a magnetizing magnetic field of higher intensity. As described above, there has appeared a rotor that is difficult to magnetize by means of a conventional magnetizing device.

As a countermeasure against such problems, it may be considered to ensure the necessary magnetic field intensity by increasing the power supply capacity and the electrical current flowing through the magnetizing coils. However, such an increase in the electrical current results in a shortening of the product lifetime of the magnetizing coils, together with an increase in investment in power supply equipment, thereby increasing manufacturing costs.

An object of the present invention is to solve the aforementioned problems.

A first aspect of the present invention is characterized by a magnetizing device configured to magnetize a plurality of magnetic bodies, by applying, with respect to a rotor having a plurality of magnetic bodies arranged in a circumferential direction, a magnetic field in a diametrical direction of the rotor, the magnetizing device comprising a first magnetizing coil arranged in facing relation to an outer circumferential surface of the rotor, and configured to cause a diametrical outwardly directed first magnetic field to be generated, a second magnetizing coil arranged in facing relation to the outer circumferential surface of the rotor, and configured to cause a diametrical inwardly directed second magnetic field to be generated, a third magnetizing coil arranged in facing relation to the outer circumferential surface of the rotor, and configured to cause a diametrical inwardly directed third magnetic field to be generated, and an auxiliary coil arranged in facing relation to the outer circumferential surface of the rotor, and configured to cause a diametrical inwardly directed auxiliary magnetic field to be generated, wherein, by the first magnetizing coil drawing in with the first magnetic field a composite magnetic field which is a composite of the second magnetic field and the third magnetic field, among the plurality of magnetic bodies, at least a magnetic body through which the first magnetic field, the second magnetic field, or the third magnetic field passes is magnetized in a magnetizing direction along the diametrical direction, among magnetic fluxes caused by the second magnetic field and the third magnetic field, a magnetic flux that is not drawn in by the first magnetic field is a diametrical outwardly directed leakage magnetic flux, and by the auxiliary coil applying the auxiliary magnetic field to the rotor, among the plurality of magnetic bodies, in the case it is assumed that the auxiliary magnetic field is not present therein, a diametrical inwardly directed magnetic flux caused by the auxiliary magnetic field is made to pass with respect to a magnetic body for which there is a possibility of the magnetic body being magnetized in a direction opposite to a direction in which the magnetic body should be magnetized due to the passage of the leakage magnetic flux.

A second aspect of the present invention is characterized by a magnetizing method of magnetizing a plurality of magnetic bodies, by applying, with respect to a rotor having a plurality of magnetic bodies arranged in a circumferential direction, a magnetic field in a diametrical direction of the rotor, the magnetizing method comprising an arrangement step of arranging a first magnetizing coil, a second magnetizing coil, a third magnetizing coil, and an auxiliary coil in facing relation to an outer circumferential surface of the rotor, and a magnetizing step in which, by causing a diametrical outwardly directed first magnetic field to be generated, causing a diametrical inwardly directed second magnetic field to be generated, causing a diametrical inwardly directed third magnetic field to be generated, and by the first magnetizing coil drawing in with the first magnetic field a composite magnetic field which is a composite of the second magnetic field and the third magnetic field, among the plurality of magnetic bodies, a first magnetic body facing toward the first magnetizing coil is magnetized in a diametrical outward direction, a second magnetic body facing toward the second magnetizing coil is magnetized in a diametrical inward direction, and a third magnetic body facing toward the third magnetizing coil is magnetized in a diametrical inward direction, in the magnetizing step, among magnetic fluxes caused by the second magnetic field and the third magnetic field, a magnetic flux that is not drawn in by the first magnetic field is a diametrical outwardly directed leakage magnetic flux, and by the auxiliary coil applying the diametrical inwardly directed auxiliary magnetic field to the rotor, among the plurality of magnetic bodies, in the case it is assumed that the auxiliary magnetic field is not present therein, a diametrical inwardly directed magnetic flux caused by the auxiliary magnetic field is made to pass with respect to a magnetic body for which there is a possibility of the magnetic body being magnetized in a direction opposite to a direction in which the magnetic body should be magnetized due to the passage of the leakage magnetic flux.

According to the present invention, since the composite magnetic field in which the second magnetic field and the third magnetic field are combined is drawn in by the first magnetic field, a high intensity magnetic field reaches to the interior of the magnetic bodies of the rotor. Consequently, at a low cost, it is possible to magnetize the interior of the magnetic bodies. As a result, the magnetizing operation can be carried out efficiently with respect to the plurality of magnetic bodies.

Further, at a time when the first magnetic field draws in the composite magnetic field which is a composite of the second magnetic field and the third magnetic field, the magnetic flux that is not drawn in by the first magnetic field becomes the diametrical outwardly directed leakage magnetic flux. Among the plurality of magnetic bodies, there is a possibility that a portion of the magnetic bodies through which the leakage magnetic flux passes may be magnetized in a direction opposite to the original magnetizing direction. Thus, according to the present invention, among the plurality of magnetic bodies, the diametrical inwardly directed magnetic flux caused by the auxiliary magnetic field is made to pass with respect to the magnetic bodies that are capable of being magnetized in a direction opposite to the original magnetizing direction. In accordance with this feature, the leakage magnetic flux passes through the interior of the rotor in a manner so as to avoid such magnetic bodies. As a result, it is possible to avoid the occurrence of magnetic bodies that are magnetized in a direction opposite to the original magnetizing direction.

Therefore, according to the present invention, while causing the magnetic body in closest proximity to the first magnetizing coil in the interior of the rotor to be concentratedly magnetized, it is possible to suppress a situation in which the other magnetic bodies in the interior of the rotor are magnetized in a direction opposite to the original magnetizing direction due to the leakage magnetic flux.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
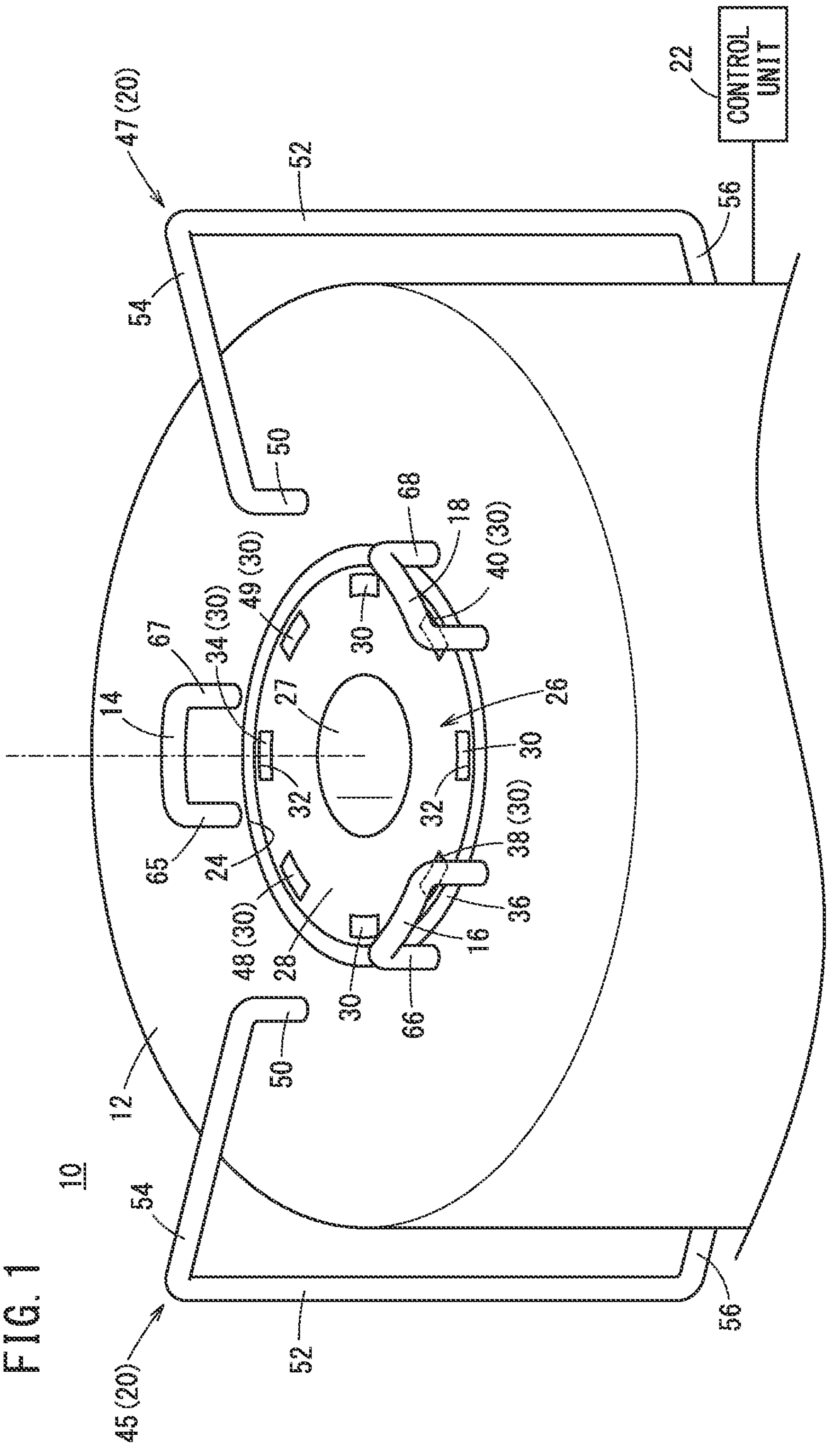
FIG. 1 is a perspective view of a magnetizing device according to the present embodiment.

FIG. 1 is a perspective view of a magnetizing device 10 according to the present embodiment.

The magnetizing device 10 according to the present embodiment is equipped with a magnetizing yoke 12, a first magnetizing coil 14, a second magnetizing coil 16, a third magnetizing coil 18, auxiliary coils 20, and a control unit 22.

The magnetizing yoke 12 is a cylindrically shaped yoke. A hollow part 24 is formed in a central portion of the magnetizing yoke 12. The hollow part 24 is formed along an axial direction of the magnetizing yoke 12. A cylindrically shaped rotor 26 (refer to FIG. 2) is accommodated in the hollow part 24. In a central portion of the rotor 26, a hollow part 27 is formed into which a non-illustrated shaft is inserted. As shown in FIG. 1, the rotor 26 is accommodated in the hollow part 24 along the axial direction of the magnetizing yoke 12. The inner diameter of the hollow part 24 is slightly larger than the outer diameter of the rotor 26.

Figure 3:
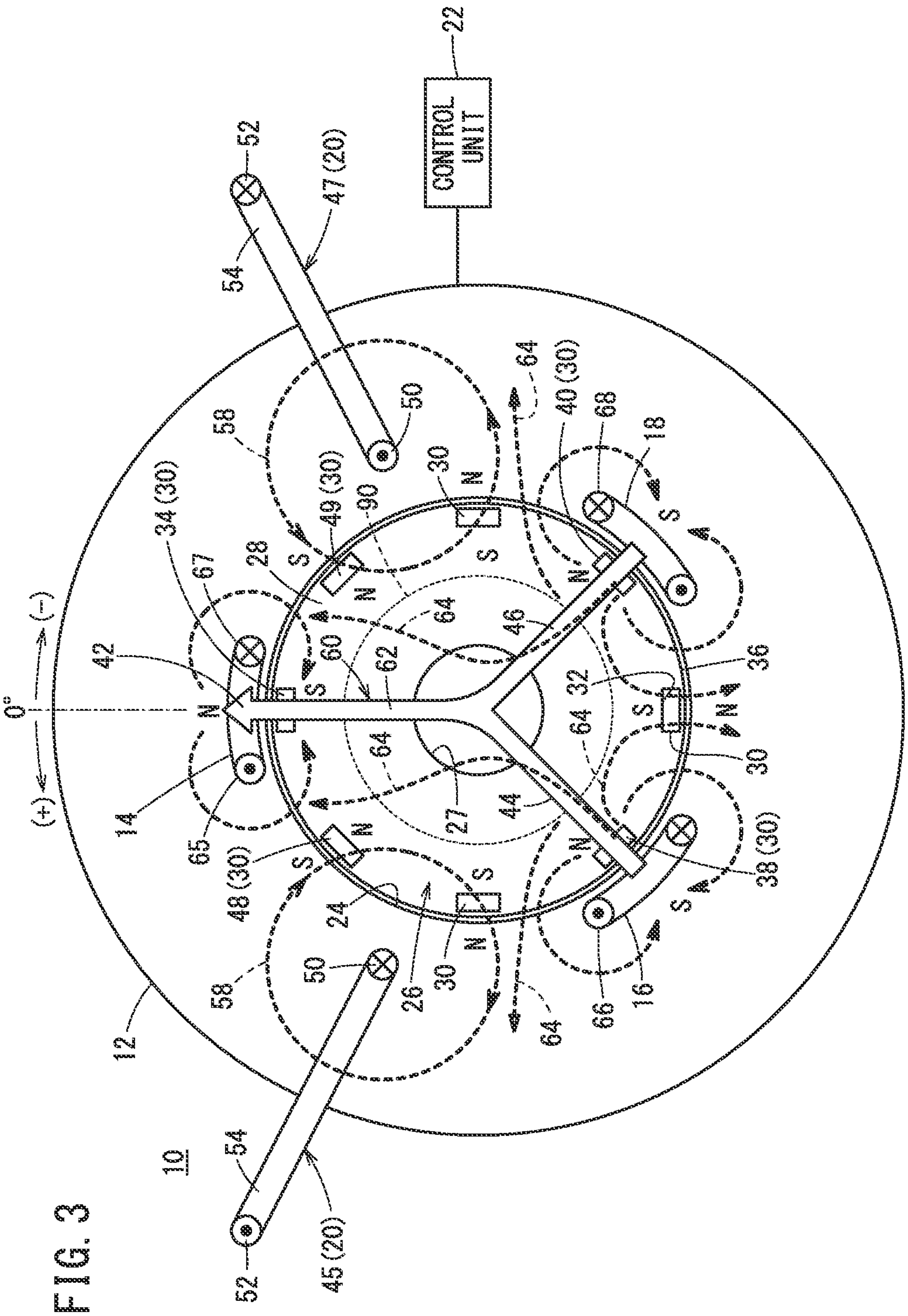
FIG. 3 is a diagram showing a magnetic field distribution of the magnetizing device according to the present embodiment.

The rotor 26 is used for a PM motor, for example. The rotor 26 includes a rotor main body 28 and a plurality of magnetic bodies 30. The rotor main body 28 is a cylindrically shaped member made of a soft magnetic material. A plurality of accommodation holes 32 are formed on an outer circumferential side of the rotor main body 28. The plurality of accommodation holes 32 are formed at an equal interval in the circumferential direction of the rotor main body 28. Each of the plurality of accommodation holes 32 passes in the axial direction through the rotor main body 28. Moreover, as shown in FIG. 3, according to the present embodiment, an angular position at which a first magnetic body 34 and the first magnetizing coil 14 are arranged is 0°. Further, as shown in FIG. 3, according to the present embodiment, a counterclockwise direction around a central axial line of the rotor 26 and the magnetizing yoke 12 is a positive circumferential direction of the rotor 26. Furthermore, in FIG. 3, the X markings and the dots illustrated on the first magnetizing coil 14, the second magnetizing coil 16, the third magnetizing coil 18, and the auxiliary coils 20 indicate the direction of the electrical current.

The magnetic bodies 30 are inserted into each of the plurality of accommodation holes 32. Each of the plurality of magnetic bodies 30 is fixed to the rotor main body 28 by being sealed by means of a non-illustrated resin in a state of being inserted into the accommodation holes 32. The plurality of magnetic bodies 30 are magnetic bodies that serve as objects to be magnetized by the magnetizing device 10. The plurality of magnetic bodies 30 are hard magnetic bodies. The plurality of magnetic bodies 30 become permanent magnets due to being magnetized by the magnetizing device 10. The rotor main body 28 and both ends of the plurality of magnetic bodies 30 are covered with a non-illustrated reinforcing layer made of a carbon fiber composite material or the like.

According to the present embodiment, for example, eight of the accommodation holes 32 are formed in the rotor main body 28. Specifically, as viewed in plan, the eight accommodation holes 32 are formed at an interval of 45° in the circumferential direction of the rotor 26 (refer to FIG. 3). Accordingly, eight individual magnetic bodies 30 are accommodated in the rotor main body 28 at an interval of 45° in the circumferential direction of the rotor 26. The rotor 26 may be used for an SPM motor. Further, the number of the magnetic bodies 30 (the number of poles of the rotor 26) is not limited to being eight.

Figure 2:
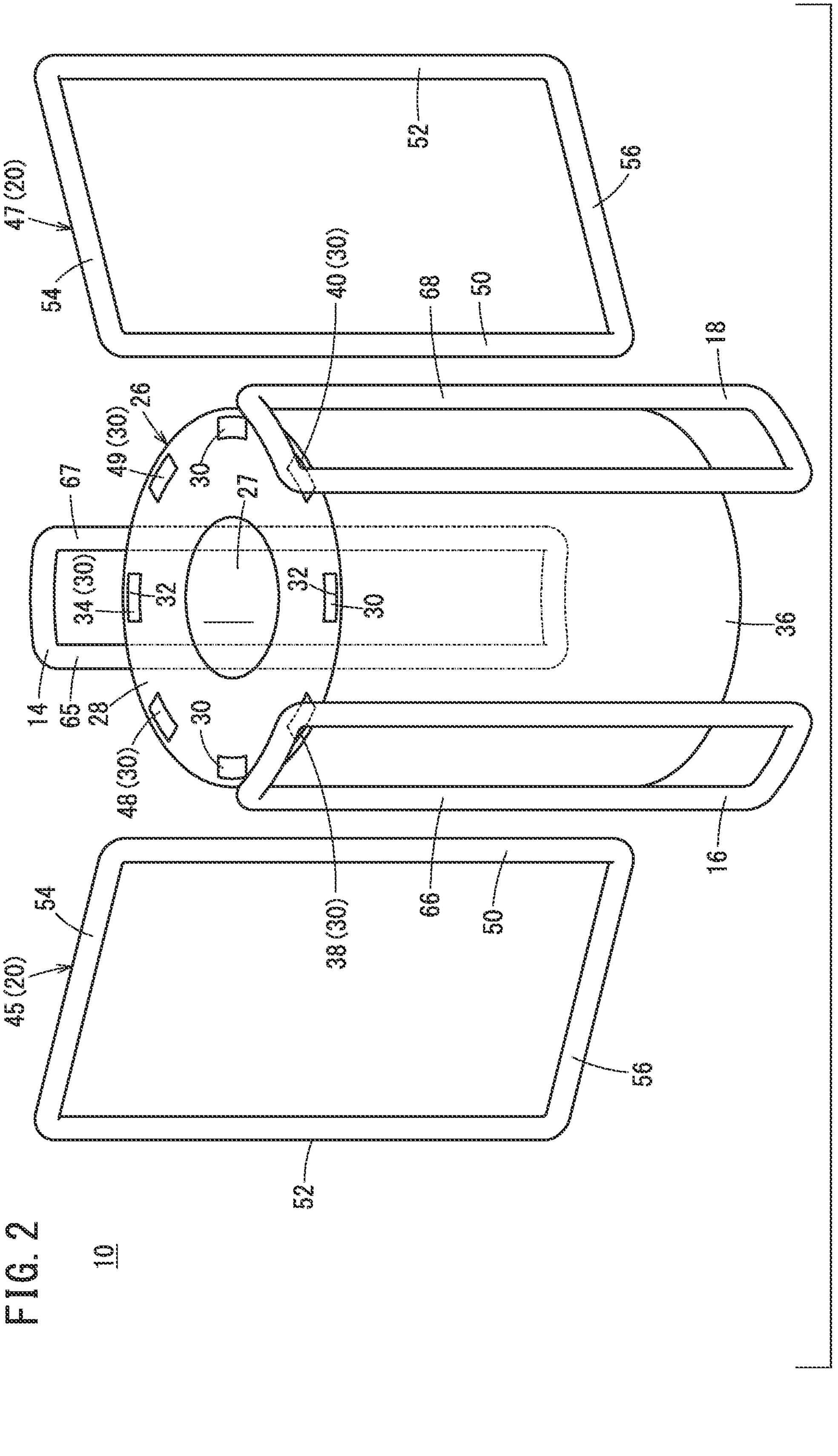
FIG. 2 is a perspective view of a rotor, a first magnetizing coil, a second magnetizing coil, a third magnetizing coil, and auxiliary coils.

The first magnetizing coil 14, the second magnetizing coil 16, and the third magnetizing coil 18 are arranged in close proximity to the hollow part 24 in the magnetizing yoke 12. The first magnetizing coil 14, the second magnetizing coil 16, and the third magnetizing coil 18 are arranged with predetermined angles apart in the circumferential direction of the magnetizing yoke 12. As shown in FIG. 2 and FIG. 3, each of the first magnetizing coil 14, the second magnetizing coil 16, and the third magnetizing coil 18 face toward an outer circumferential surface 36 of the rotor 26 (the rotor main body 28) so that the central axial line thereof points in a diametrical direction of the rotor 26.

According to the present embodiment, at a time when the position of the first magnetizing coil 14 is assumed to be at 0°, the second magnetizing coil 16 is arranged at 135°, and the third magnetizing coil 18 is arranged at 225°. Accordingly, as viewed in plan, the first magnetizing coil 14, the second magnetizing coil 16, and the third magnetizing coil 18 are arranged so as to have a Y-shaped positional relationship.

Moreover, according to the present embodiment, the first magnetizing coil 14, the second magnetizing coil 16, and the third magnetizing coil 18 may be arranged with predetermined angles apart in the circumferential direction of the magnetizing yoke 12. Accordingly, the first magnetizing coil 14, the second magnetizing coil 16, and the third magnetizing coil 18 may be arranged in any arbitrary positional relationship. Further, the angular positions of the first magnetizing coil 14, the second magnetizing coil 16, and the third magnetizing coil 18 may be appropriately adjusted in accordance with the number of poles (and the arrangement angles) of the magnetic bodies 30 that serve as objects to be magnetized.

The first magnetizing coil 14, the second magnetizing coil 16, and the third magnetizing coil 18 are arranged at angular positions facing toward any one magnetic body 30 from among the plurality of magnetic bodies 30. Specifically, the first magnetizing coil 14 faces toward a magnetic body 30 (the first magnetic body 34) arranged at an angle of 0°. The second magnetizing coil 16 faces toward a magnetic body 30 (a second magnetic body 38) arranged at an angle of 135°. The third magnetizing coil 18 faces toward a magnetic body 30 (a third magnetic body 40) arranged at an angle of 225°.

The control unit 22 supplies an electrical current for the purpose of generating a magnetic field used for magnetization to the first magnetizing coil 14, the second magnetizing coil 16, and the third magnetizing coil 18. Further, the control unit 22 supplies an electrical current to the auxiliary coils 20 in order to cause an auxiliary usage magnetic field (auxiliary magnetic field) to be generated.

By the electrical current being supplied from the control unit 22, the first magnetizing coil 14, the second magnetizing coil 16, and the third magnetizing coil 18 generate magnetic fields along the diametrical direction of the rotor 26 (refer to FIG. 3). The generated magnetic fields are applied to the rotor 26.

Specifically, the first magnetizing coil 14 causes a diametrical outwardly directed magnetic field (a first magnetic field 42) to be generated, and applies the generated first magnetic field 42 to the rotor 26. The first magnetic body 34 that faces toward the first magnetizing coil 14 is magnetized in a diametrical outward direction by the first magnetic field 42.

The second magnetizing coil 16 causes a diametrical inwardly directed magnetic field (a second magnetic field 44) to be generated, and applies the generated second magnetic field 44 to the rotor 26. The second magnetic body 38 that faces toward the second magnetizing coil 16 is magnetized in a diametrical inward direction by the second magnetic field 44.

The third magnetizing coil 18 causes a diametrical inwardly directed magnetic field (a third magnetic field 46) to be generated, and applies the generated third magnetic field 46 to the rotor 26. The third magnetic body 40 that faces toward the third magnetizing coil 18 is magnetized in a diametrical inward direction by the third magnetic field 46.

According to the present embodiment, the directions of the first magnetic field 42, the second magnetic field 44, and the third magnetic field 46 are determined by the winding direction (the direction of winding) of the first magnetizing coil 14, the second magnetizing coil 16, and the third magnetizing coil 18, respectively. In this case, the winding direction of the first magnetizing coil 14, and the winding direction of the second magnetizing coil 16 and the third magnetizing coil 18 are in directions that are different from each other. Consequently, the first magnetizing coil 14 causes the diametrical outwardly directed first magnetic field 42 to be generated. Further, each of the second magnetizing coil 16 and the third magnetizing coil 18 causes a diametrical inwardly directed magnetic field (the second magnetic field 44, the third magnetic field 46) to be generated.

Moreover, it should be noted that, in FIG. 1 to FIG. 3, the first magnetizing coil 14, the second magnetizing coil 16, and the third magnetizing coil 18 are schematically illustrated. According to the present embodiment, the number of windings (or turns) of each of the first magnetizing coil 14, the second magnetizing coil 16, and the third magnetizing coil 18 is one or more.

Further, according to the present embodiment, the orientations of each of the first magnetic field 42, the second magnetic field 44, and the third magnetic field 46 may be determined by the direction of the electrical current supplied from the control unit 22 to the first magnetic field 42, the second magnetic field 44, and the third magnetic field 46.

According to the present embodiment, for example, after magnetization has been carried out at the angular positions shown in FIG. 1 to FIG. 3, the rotor 26 is rotated by a predetermined angle under human power or the like, and the magnetization is repeatedly carried out. Therefore, the plurality of magnetic bodies 30, which are arranged alongside one another in the circumferential direction, are magnetized in a manner so that the north poles and the south poles thereof alternately appear on the outer circumferential side of the rotor 26.

Moreover, the number of windings (or turns) and the supplied current of the first magnetizing coil 14, the second magnetizing coil 16, and the third magnetizing coil 18 may be the same. Further, according to the present embodiment, the magnetization may be repeatedly carried out by causing the rotor 26 to be rotated by a predetermined angle about a central axial line of the rotor 26 by means of a non-illustrated rotation mechanism.

As shown in FIG. 2 and FIG. 3, the auxiliary coils 20 are arranged on the magnetizing yoke 12 in a manner so as to face toward the outer circumferential surface 36 of the rotor 26. The auxiliary coils 20 include a first auxiliary coil 45 and a second auxiliary coil 47.

The first auxiliary coil 45 is arranged between the first magnetizing coil 14 and the second magnetizing coil 16. The first auxiliary coil 45 is arranged in a manner so that a central axial line thereof points in a tangential direction of the outer circumferential surface 36 of the rotor 26. The second auxiliary coil 47 is arranged between the first magnetizing coil 14 and the third magnetizing coil 18. The second auxiliary coil 47 is arranged in a manner so that a central axial line thereof points in a tangential direction of the outer circumferential surface 36 of the rotor 26. Accordingly, the auxiliary coils 20 (the first auxiliary coil 45 and the second auxiliary coil 47) are arranged on the magnetizing yoke 12 in a manner so as to sandwich the first magnetizing coil 14 therebetween.

Each of the first auxiliary coil 45 and the second auxiliary coil 47 includes a first straight line portion 50, a second straight line portion 52, a first connecting portion 54, and a second connecting portion 56. The first straight line portion 50 extends in the axial direction of the rotor 26. The second straight line portion 52 is arranged on the diametrically directed outer side of the rotor 26 at an interval from the first straight line portion 50. The second straight line portion 52 extends in the axial direction of the rotor 26. The first connecting portion 54 extends in the diametrical direction of the rotor 26. The first connecting portion 54 connects one end of the first straight line portion 50 and one end of the second straight line portion 52. The second connecting portion 56 extends in the diametrical direction of the rotor 26. The second connecting portion 56 connects another end of the first straight line portion 50 and another end of the second straight line portion 52. Moreover, the length of each of the first connecting portion 54 and the second connecting portion 56 along the diametrical direction of the rotor 26 is shorter than the length of each of the first straight line portion 50 and the second straight line portion 52 along the axial direction of the rotor 26.

The first straight line portion 50 of the first auxiliary coil 45 is disposed between the first magnetizing coil 14 and the second magnetizing coil 16. In detail, the first straight line portion 50 of the first auxiliary coil 45 is arranged at an angular position between an adjacent portion 65 adjacent to the first straight line portion 50 within the first magnetizing coil 14, and an adjacent portion 66 adjacent to the first straight line portion 50 within the second magnetizing coil 16. In FIG. 1 to FIG. 3, the first straight line portion 50 of the first magnetizing coil 45 is arranged, within the outer circumferential surface 36 of the rotor 26, in a manner so as to face toward a portion between a magnetic body 30 (a fourth magnetic body 48 that is one of the magnetic bodies 30 adjacent to the first magnetic body 34) that is arranged at an angular position of 45° From the first magnetic body 34 along the circumferential direction, and a magnetic body 30 that is arranged at an angular position of 90° from the first magnetic body 34. Moreover, the adjacent portion 65 is also a portion within the first magnetizing coil 14 that is in close proximity to the second magnetizing coil 16 along the circumferential direction of the rotor 26. Further, the adjacent portion 66 is also a portion within the second magnetizing coil 16 that is in close proximity to the first magnetizing coil 14 along the circumferential direction of the rotor 26.

Further, the first straight line portion 50 of the second auxiliary coil 47 is disposed between the first magnetizing coil 14 and the third magnetizing coil 18. In detail, the first straight line portion 50 of the second auxiliary coil 47 is arranged at an angular position between an adjacent portion 67 adjacent to the first straight line portion 50 within the first magnetizing coil 14, and an adjacent portion 68 adjacent to the first straight line portion 50 within the third magnetizing coil 18. In FIG. 1 to FIG. 3, the first straight line portion 50 of the second auxiliary coil 47 is arranged, within the outer circumferential surface 36 of the rotor 26, in a manner so as to face toward a portion between a magnetic body 30 (a fifth magnetic body 49 that is another of the magnetic bodies 30 adjacent to the first magnetic body 34) that is arranged at an angular position of −45° from the first magnetic body 34 along the circumferential direction, and a magnetic body 30 that is arranged at an angular position of −90° from the first magnetic body 34. Moreover, the adjacent portion 67 is also a portion within the first magnetizing coil 14 that is in close proximity to the third magnetizing coil 18 along the circumferential direction of the rotor 26. Further, the adjacent portion 68 is also a portion within the third magnetizing coil 18 that is in close proximity to the first magnetizing coil 14 along the circumferential direction of the rotor 26.

The auxiliary coils 20, by supply of the electrical current from the control unit 22, generate two auxiliary magnetic fields in a manner so as to sandwich the first magnetic field 42 therebetween. Specifically, in each of the first auxiliary coil 45 and the second auxiliary coil 47, the first straight line portion 50 generates a diametrical inwardly directed auxiliary magnetic field due to the electrical current supplied from the control unit 22. According to the present embodiment, the directions of the auxiliary magnetic fields are determined by the winding method (the winding direction) of each of the first auxiliary coil 45 and the second auxiliary coil 47. In this case, the winding direction of the first auxiliary coil 45 and the winding direction of the second auxiliary coil 47 are directions that differ from the winding direction of the first magnetizing coil 14. Consequently, each of the first auxiliary coil 45 and the second auxiliary coil 47 causes a diametrical inwardly directed auxiliary magnetic field to be generated.

The intensity of each of the auxiliary magnetic fields is smaller than the intensity of the first magnetic field 42 to the third magnetic field 46. According to the present embodiment, the intensity of the auxiliary magnetic fields is determined by the number of windings (or turns) of each of the auxiliary coils 20 (the first auxiliary coil 45, the second auxiliary coil 47). Therefore, as the number of windings of the auxiliary coils 20 becomes smaller, the intensity of the auxiliary magnetic fields becomes weaker. In other words, according to the present embodiment, by appropriately adjusting the number of windings of each of the first auxiliary coil 45 and the second auxiliary coil 47, the intensity of each of the auxiliary magnetic fields can be made smaller than the intensity of the first magnetic field 42 to the third magnetic field 46.

Each of the generated auxiliary magnetic fields is applied to the rotor 26. A diametrical inwardly directed magnetic flux 58 caused by the auxiliary magnetic fields passes through the fourth magnetic body 48 and the fifth magnetic body 49 which are adjacent to the first magnetic body 34 in the circumferential direction with the first magnetic body 34 being sandwiched therebetween.

Moreover, as shown in FIG. 3, the magnetic flux 58 is a magnetic flux that circulates about the first straight line portion 50. Therefore, the magnetic flux 58 passes through the magnetic body 30 that is arranged between the fourth magnetic body 48 and the second magnetic body 38 in a diametrical outward direction. Further, the magnetic flux 58 passes through the magnetic body 30 that is arranged between the fifth magnetic body 49 and the third magnetic body 40 in a diametrical outward direction. In other words, when viewed from these magnetic bodies 30, the first auxiliary coil 45 and the second auxiliary coil 47 serve to apply diametrical outwardly directed magnetic fields (auxiliary magnetic fields).

FIG. 1 to FIG. 3 show, as an example, a case in which the number of windings of each of the first auxiliary coil 45 and the second auxiliary coil 47 is one, and the same treatment will be applied hereinafter.

Moreover, according to the present embodiment, the direction of the auxiliary magnetic fields may be determined by the direction of the electrical current supplied from the control unit 22 to the first auxiliary coil 45 and the second auxiliary coil 47.

The magnetizing device 10 of the present embodiment is configured as described above. Next, a description will be given with reference to the flowchart of FIG. 4 concerning a magnetizing method of the present embodiment.

Figure 4:
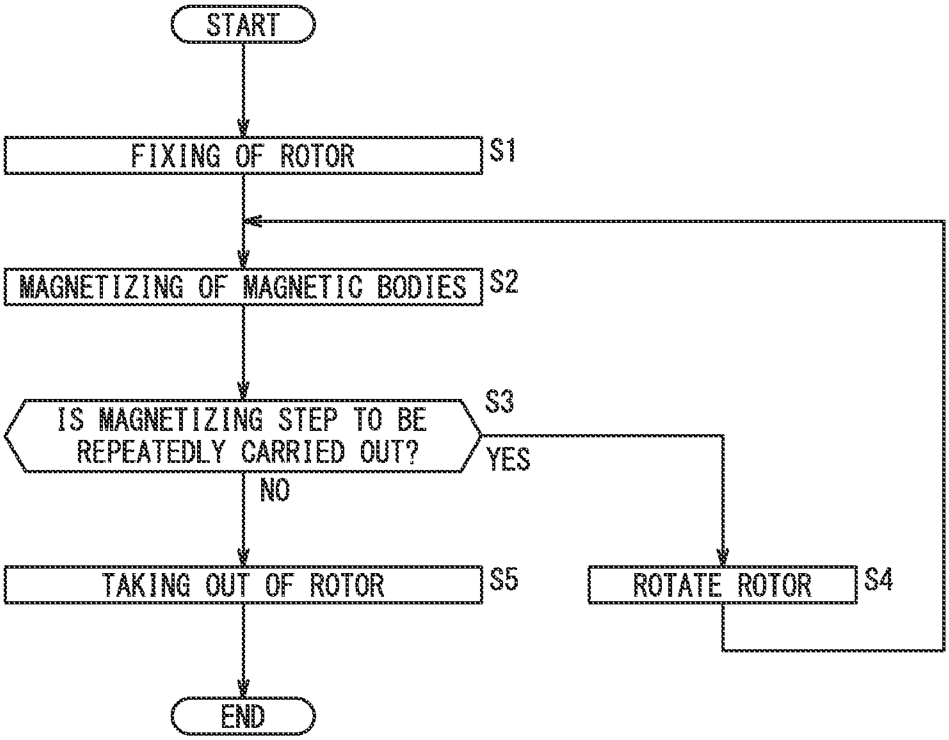
FIG. 4 is a flowchart showing a magnetizing method according to the present embodiment.

In an arrangement step of step S1 in FIG. 4, the rotor 26 is fixed to the magnetizing device 10 (refer to FIG. 1 and FIG. 3). Specifically, the rotor 26 having the eight individual magnetic bodies 30 is arranged in the hollow part 24. In this case, among the plurality of magnetic bodies 30, three of the magnetic bodies 30 are positioned in the circumferential direction of the rotor 26 with respect to the magnetizing yoke 12, in a manner so as to face in the diametrical direction of the rotor 26 toward the first magnetizing coil 14, the second magnetizing coil 16, and the third magnetizing coil 18. Consequently, the magnetic body 30 that faces in the diametrical direction of the rotor 26 with respect to the first magnetizing coil 14 becomes the first magnetic body 34. The magnetic body 30 that faces in the diametrical direction with respect to the second magnetizing coil 16 becomes the second magnetic body 38. The magnetic body 30 that faces in the diametrical direction with respect to the third magnetizing coil 18 becomes the third magnetic body 40. Stated otherwise, in the arrangement step of step S1, the first magnetizing coil 14, the second magnetizing coil 16, the third magnetizing coil 18, and the auxiliary coils 20 (the first auxiliary coil 45, the second auxiliary coil 47) are arranged in a manner so as to face toward the outer circumferential surface 36 of the rotor 26. Thereafter, the rotor 26 is fixed to the magnetizing yoke 12 by a non-illustrated fixing member.

In a subsequent magnetizing step of step S2, a first magnetizing operation is carried out. In the magnetizing step, the control unit 22 supplies an electrical current to the first magnetizing coil 14, the second magnetizing coil 16, and the third magnetizing coil 18.

While the electrical current is supplied from the control unit 22, the first magnetizing coil 14 causes the diametrical outwardly directed first magnetic field 42 to be generated. When the first magnetic field 42 is generated, a diametrical outwardly directed magnetic flux passes through the first magnetic body 34. Consequently, the first magnetic body 34 is magnetized in a diametrical outward direction. More specifically, the first magnetic body 34 is magnetized in a direction in which the diametrically directed outer side thereof becomes the N pole, and the diametrically directed inner side thereof becomes the S pole.

While the electrical current is supplied from the control unit 22, the second magnetizing coil 16 causes the diametrical inwardly directed second magnetic field 44 to be generated. When the second magnetic field 44 is generated, a diametrical inwardly directed magnetic flux passes through the second magnetic body 38. Consequently, the second magnetic body 38 is magnetized in a diametrical inward direction. More specifically, the second magnetic body 38 is magnetized in a direction in which the diametrically directed inner side thereof becomes the N pole, and the diametrically directed outer side thereof becomes the S pole.

While the electrical current is supplied from the control unit 22, the third magnetizing coil 18 causes a diametrical inwardly directed third magnetic field 46 to be generated. When the third magnetic field 46 is generated, a diametrical inwardly directed magnetic flux passes through the third magnetic body 40. Consequently, the third magnetic body 40 is magnetized in a diametrical inward direction. More specifically, the third magnetic body 40 is magnetized in a direction in which the diametrically directed inner side thereof becomes the N pole, and the diametrically directed outer side thereof becomes the S pole.

In the magnetizing step, as shown by the white arrow in FIG. 3, as viewed in plan, a Y-shaped magnetic circuit 60 in the interior of the rotor 26 is formed by the magnetic field (the first magnetic field 42) passing through the first magnetic body 34, the magnetic field (the second magnetic field 44) passing through the second magnetic body 38, and the magnetic field (the third magnetic field 46) passing through the third magnetic body 40. Consequently, with respect to the rotor 26 as well, which is relatively small in diameter, the magnetic field used for magnetization reaches to a central side of the first magnetic body 34, the second magnetic body 38, and the third magnetic body 40. As a result, the first magnetic body 34, the second magnetic body 38, and the third magnetic body 40 can be magnetized more effectively.

Further, by means of the first magnetic field 42, the first magnetizing coil 14 draws in a composite magnetic field 62 that is a composite of the second magnetic field 44 and the third magnetic field 46. Consequently, magnetic flux lines are concentrated in the vicinity of the first magnetizing coil 14, whereby the magnetic field intensity greatly increases in the vicinity of the first magnetizing coil 14. Further, the magnetic field intensity in the vicinity of the second magnetizing coil 16 and the third magnetizing coil 18 also increases. As a result, the magnetic susceptibility of the first magnetic body 34, the second magnetic body 38, and the third magnetic body 40 can be increased, and high performance permanent magnets with higher magnetic flux density can be formed.

Furthermore, in the magnetizing step, at a time when the first magnetizing coil 14 draws in the composite magnetic field 62 by the first magnetic field 42, as shown by the dashed lines, the magnetic flux that is not drawn in by the first magnetic field 42 becomes a diametrical outwardly directed leakage magnetic flux 64. Among the plurality of magnetic bodies 30, due to the passage of the leakage magnetic flux 64, there is a possibility that a portion of the magnetic bodies 30 may be magnetized in a direction opposite to the original magnetizing direction.

Specifically, the fourth magnetic body 48 and the fifth magnetic body 49, which are adjacent to each other in the circumferential direction in a manner so as to sandwich the first magnetic body 34 therebetween, are originally magnetized in a diametrical inward direction. However, when the diametrical outwardly directed leakage magnetic flux 64 passes through the fourth magnetic body 48 and the fifth magnetic body 49, there is a possibility that the fourth magnetic body 48 and the fifth magnetic body 49 may be magnetized in a direction (the diametrical outward direction) opposite to the original diametrical inwardly directed magnetizing direction.

Moreover, it should be noted that the leakage magnetic flux 64 also passes through each of the magnetic bodies 30 that are arranged at the angular positions of 90°, 180°, and 270° with respect to the first magnetic body 34. However, the original magnetizing direction of these magnetic bodies 30 is the diametrical outward direction. Therefore, even if the diametrical outwardly directed leakage magnetic flux 64 passes through these magnetic bodies 30, these magnetic bodies will not be magnetized in a direction (the diametrical outward direction) opposite to the original magnetizing direction.

Thus, in the magnetizing step, in addition to the first magnetizing coil 14, the second magnetizing coil 16, and the third magnetizing coil 18, the control unit 22 supplies the electrical current to the auxiliary coils 20. While the electrical current is supplied from the control unit 22, the auxiliary coils 20 cause a diametrical inwardly directed auxiliary magnetic field to be generated.

Specifically, the control unit 22 supplies the electrical current to the first auxiliary coil 45 and the second auxiliary coil 47.

The winding direction of the first auxiliary coil 45, and the winding direction of the first magnetizing coil 14 and the second magnetizing coil 16 are different from each other. Therefore, the electrical current flowing through the first straight line portion 50 of the first auxiliary coil 45 becomes an electrical current in an opposite direction to the electrical current flowing through the adjacent portion 65 of the first magnetizing coil 14 and the adjacent portion 66 of the second magnetizing coil 16. By the electrical current flowing through the first straight line portion 50 of the first auxiliary coil 45, a first auxiliary magnetic field is generated circumferentially around the first straight line portion 50. Due to the first auxiliary magnetic field being generated, the diametrical inwardly directed magnetic flux 58 passes through the fourth magnetic body 48 that is adjacent to the first magnetic body 34 along the circumferential direction of the rotor 26. Consequently, the diametrical outwardly directed leakage magnetic flux 64 passes through the interior of the rotor 26 in a manner so as to avoid the fourth magnetic body 48. As a result, it is possible to avoid a situation in which the fourth magnetic body 48 is magnetized in a direction that is opposite to the original magnetizing direction (the direction of the diametrically directed inner side).

The winding direction of the second auxiliary coil 47, and the winding direction of the first magnetizing coil 14 and the third magnetizing coil 18 are different from each other. Therefore, the electrical current flowing through the first straight line portion 50 of the second auxiliary coil 47 becomes an electrical current in an opposite direction to the electrical current flowing through the adjacent portion 67 of the first magnetizing coil 14 and the adjacent portion 68 of the third magnetizing coil 18. By the electrical current flowing through the first straight line portion 50 of the second auxiliary coil 47, a second auxiliary magnetic field is generated circumferentially around the first straight line portion 50. Due to the second auxiliary magnetic field being generated, the diametrical inwardly directed magnetic flux 58 passes through the fifth magnetic body 49 that is adjacent to the first magnetic body 34 along the circumferential direction of the rotor 26. Consequently, the diametrical outwardly directed leakage magnetic flux 64 passes through the interior of the rotor 26 in a manner so as to avoid the fifth magnetic body 49. As a result, it is possible to avoid a situation in which the fifth magnetic body 49 is magnetized in a direction that is opposite to the original magnetizing direction (the direction of the diametrically directed inner side).

By the diametrical inwardly directed magnetic flux 58 passing through with respect to the fourth magnetic body 48 and the fifth magnetic body 49 that are adjacent to each other sandwiching the first magnetic body 34 therebetween, the diametrical outwardly directed leakage magnetic flux 64 passes through the interior of the rotor 26 in a manner so as to avoid the fourth magnetic body 48 and the fifth magnetic body 49. Consequently, it is possible to avoid a situation in which the fourth magnetic body 48 and the fifth magnetic body 49 are magnetized in a direction that is opposite to the original magnetizing direction (the direction of the diametrically directed inner side).

After the first magnetizing operation is completed in the manner described above, in a following step S3, it is determined whether or not the magnetizing step of step S2 is to be repeated.

In the case of repeating the magnetizing step of step S2 (step S3: YES), it is determined to execute the magnetizing step for a second time. In a following step S4, the rotor 26 is rotated by −90° under human power or the like. Consequently, the magnetic body 30, which was arranged at an angle of 90° in the magnetizing step for the first time, faces toward the first magnetizing coil 14. More specifically, the three magnetic bodies 30 that were not magnetized in the first magnetization operation are used as a new first magnetic body 34 to a third magnetic body 40, and are made to face in the diametrical direction of the rotor 26 toward the first magnetizing coil 14 to the third magnetizing coil 18.

Thereafter, the process returns to step S2, and a second magnetizing operation is executed in the same manner as in the first magnetizing operation. Thereafter, in the same manner, after the second magnetizing operation has been completed, the rotor 26 is rotated by −90°, and a third magnetizing operation is executed. Further, after the third magnetizing operation has been completed, the rotor 26 is rotated by −90°, and a fourth magnetizing operation is executed. In this manner, by performing the magnetizing operation four times, all of the magnetic bodies 30 are magnetized.

After the fourth magnetizing operation is completed, in step S3, it is determined to bring the magnetizing operation to an end (step S3: NO). Thereafter, the magnetizing device 10 proceeds to step S5.

In step S5, the rotor 26 is taken out from the magnetizing device 10.

Figure 5:
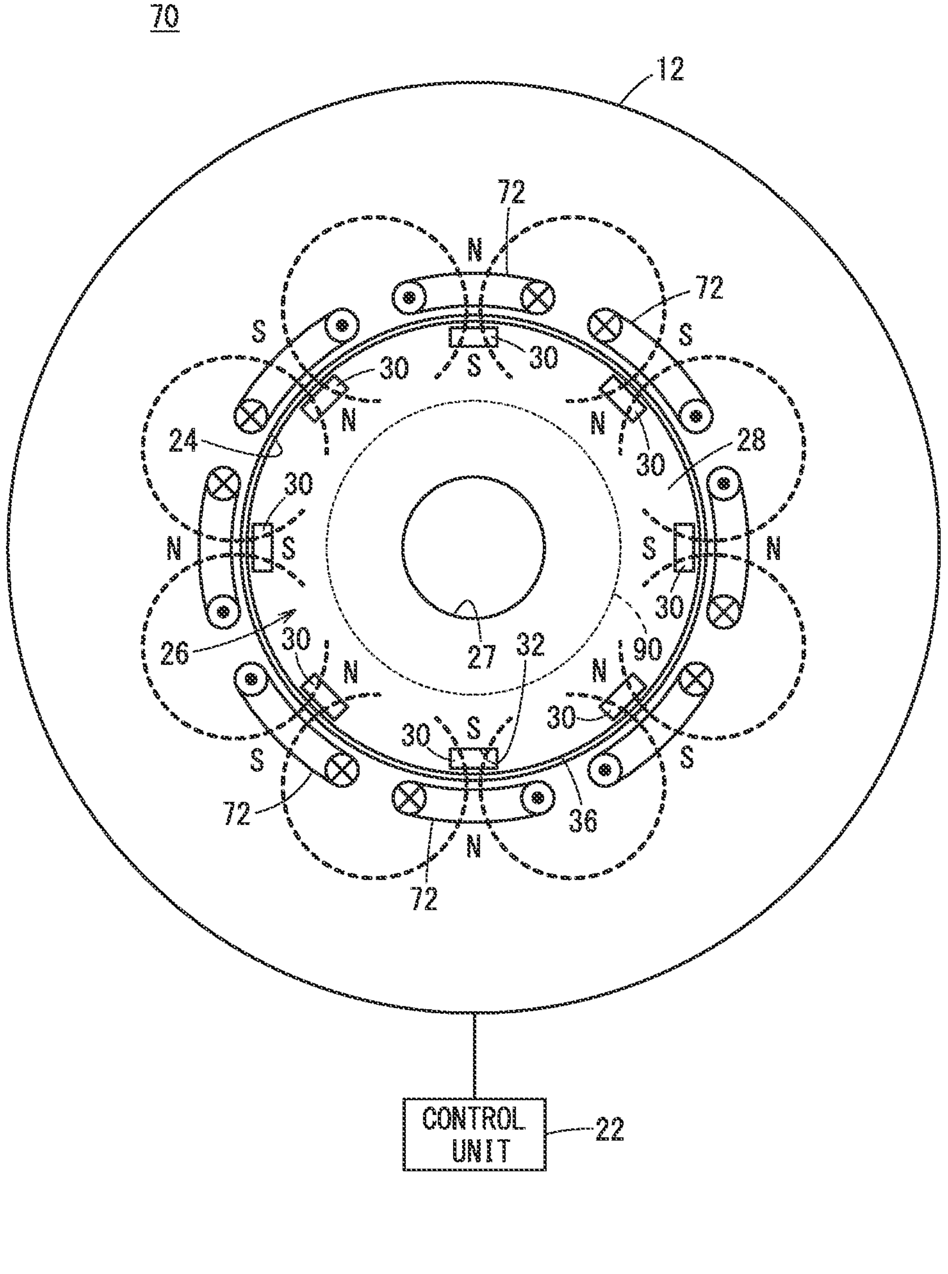
FIG. 5 is a view showing a magnetic field distribution of a magnetizing device according to a first comparative example.

FIG. 5 is a view showing a magnetic field distribution of a magnetizing device 70 according to a first comparative example. Moreover, it should be noted that, in the first comparative example, the same constituent features as those of the present embodiment will be denoted and described with the same reference numerals, and the same treatment will be applied hereinafter.

In the first comparative example, the magnetizing device 70 which has eight individual magnetizing coils 72 is used. The eight individual magnetizing coils 72 are arranged in facing relation to each of the eight individual magnetic bodies 30. In the case of the magnetizing device 70, an electrical current is supplied simultaneously from the control unit 22 to the eight individual magnetizing coils 72. Stated otherwise, according to the first comparative example, the eight individual magnetic bodies 30 are magnetized simultaneously. However, in the first comparative example, the magnetic circuit is made smaller in comparison with that in the present embodiment (refer to FIG. 3). A sufficient magnetic field cannot be applied inwardly of the magnetic body 30.

In contrast thereto, according to the present embodiment, as shown in FIG. 3, the electrical current is supplied to the first magnetizing coil 14, the second magnetizing coil 16, and the third magnetizing coil 18 that are spaced apart in the circumferential direction. In addition, according to the present embodiment, a large magnetic circuit 60 can be formed. Therefore, it is possible to effectively magnetize the first magnetic body 34 to the third magnetic body 40 to the interior thereof. Further, since the magnetic flux passing through the second magnetic body 38 and the third magnetic body 40 can be concentrated on the first magnetic body 34, a higher magnetic field used for magnetization is capable of being applied to the first magnetic body 34.

Figure 6:
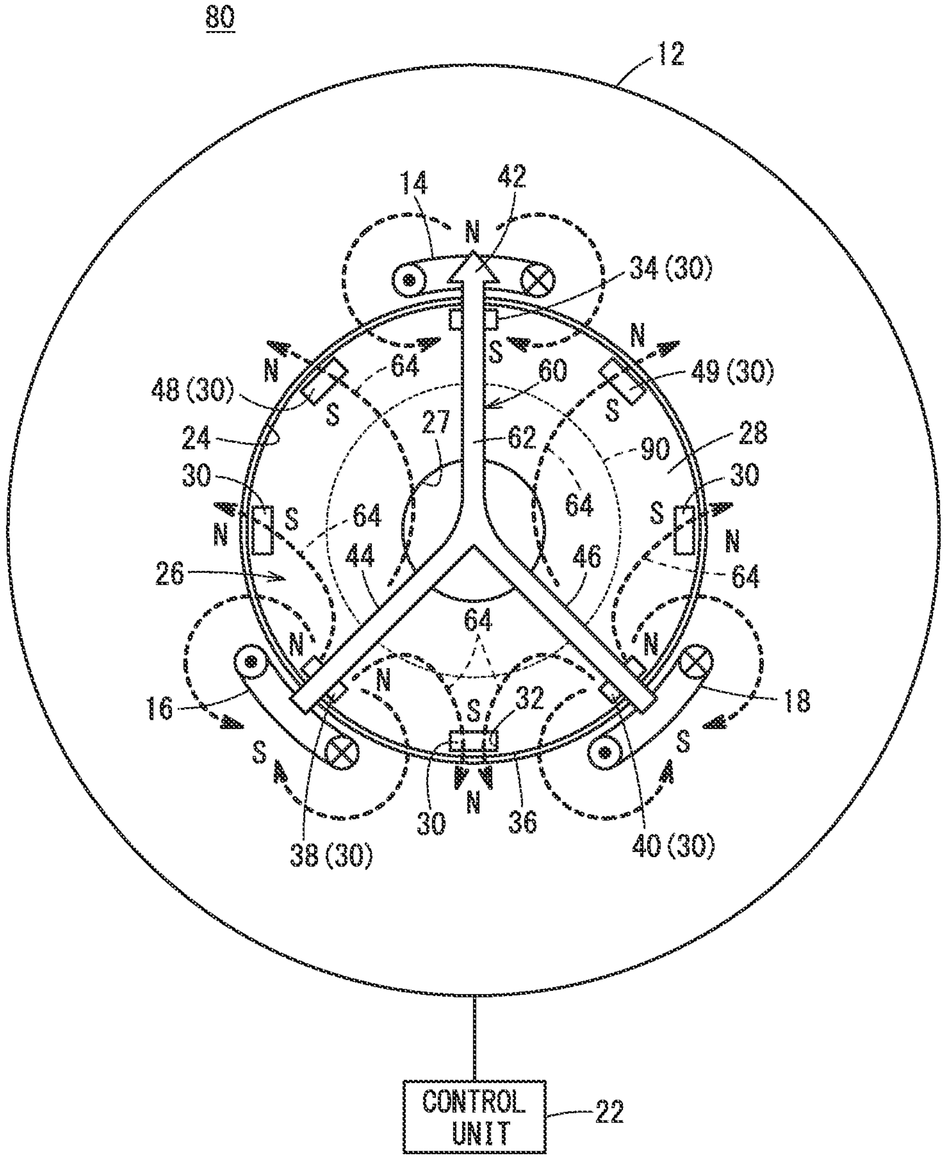
FIG. 6 is a view showing a magnetic field distribution of a magnetizing device according to a second comparative example.

FIG. 6 is a view showing a magnetic field distribution of a magnetizing device 80 according to a second comparative example. The second comparative example differs from the present embodiment (refer to FIG. 3) in that the auxiliary coils 20 are not provided. According to the second comparative example, the diametrical outwardly directed leakage magnetic flux 64 that is not drawn in by the first magnetic field 42 passes through the fourth magnetic body 48 and the fifth magnetic body 49 that are adjacent to the first magnetic body 34. Consequently, in the second comparative example, the fourth magnetic body 48 and the fifth magnetic body 49 are magnetized in a direction that is opposite to the original magnetizing direction (the diametrical inward direction).

In contrast thereto, in the present embodiment, as shown in FIG. 3, due to the diametrical inwardly directed auxiliary magnetic fields (the first auxiliary magnetic field, the second auxiliary magnetic field) that are generated in the vicinity of the first straight line portion 50 of each of the first auxiliary coil 45 and the second auxiliary coil 47 that make up the auxiliary coils 20, the diametrical inwardly directed magnetic flux 58 passes through the fourth magnetic body 48 and the fifth magnetic body 49. Consequently, the diametrical outwardly directed leakage magnetic flux 64 passes through the interior of the rotor 26 in a manner so as to avoid the diametrical inwardly directed magnetic flux 58. As a result, the fourth magnetic body 48 and the fifth magnetic body 49 can be prevented from being magnetized in a direction that is opposite to the original magnetizing direction (the diametrical inward direction).

Figure 7:
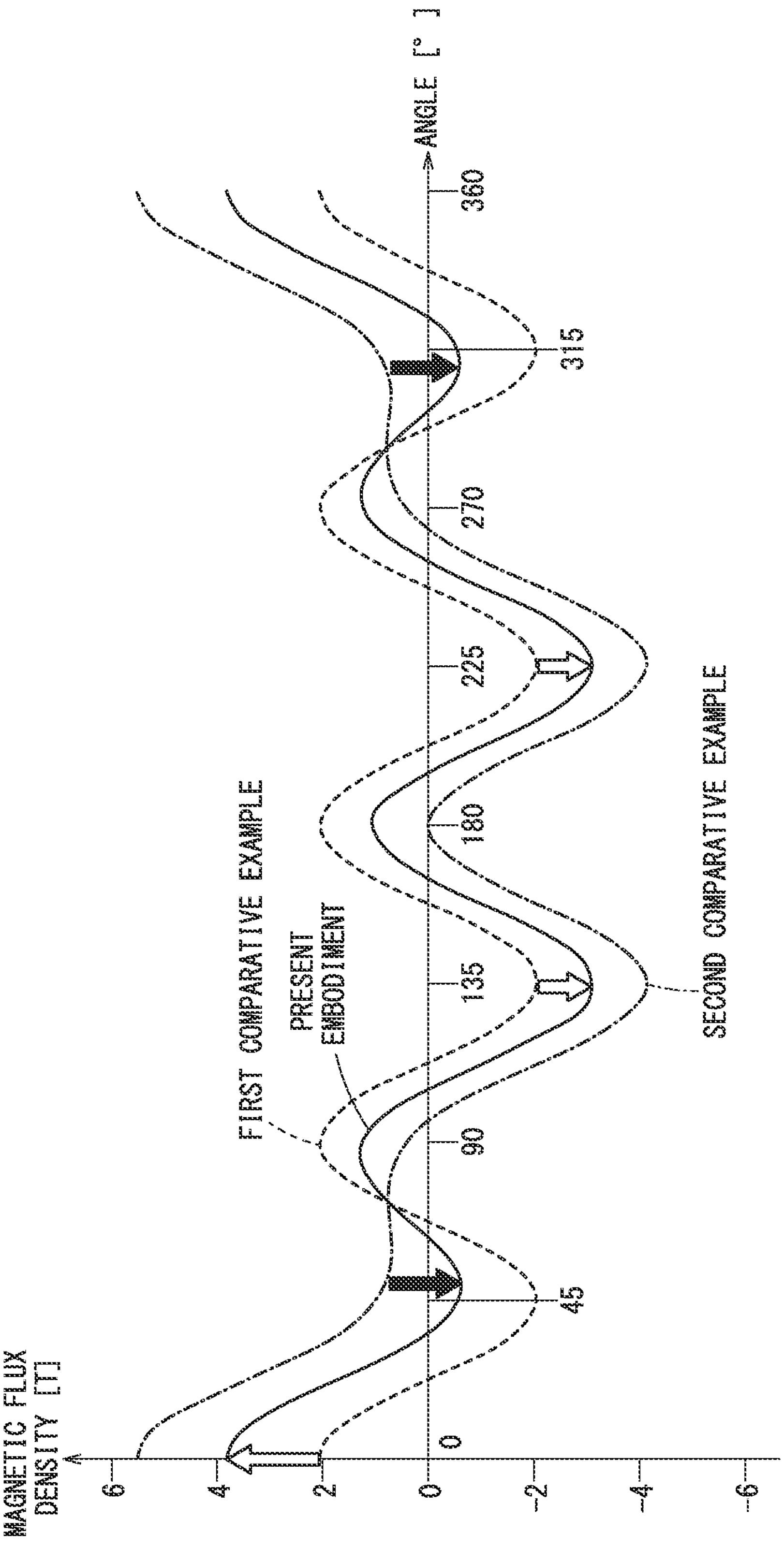
FIG. 7 is a graph showing the distribution of a magnetic flux density according to the present embodiment, the first comparative example, and the second comparative example.

FIG. 7 shows a distribution of the magnetic field intensity (magnetic flux density) obtained by a simulation calculation. Concerning the present embodiment (refer to FIG. 3), and the first comparative example (refer to FIG. 5) and the second comparative example (refer to FIG. 6), FIG. 7 shows a distribution of the magnetic field intensity along a measurement line 90 in the interior of the rotor 26. In FIG. 7, the magnetic field intensity of the present embodiment is shown by the solid line. The magnetic field intensity of the first comparative example is shown by the dashed line. The magnetic field intensity of the second comparative example is shown by the one-dot-dashed line.

According to the present embodiment, as shown by the white arrow, in any of the first magnetic body 34 (at an angular position of 0°), the second magnetic body 38 (at an angular position of 135°), and the third magnetic body 40 (at an angular position of 225°), it is understood that a higher magnetic field for magnetization is provided than in the first comparative example. Further, it is understood that the magnetic field intensity of the first magnetic body 34 where the magnetic field is concentrated becomes about two times that of the first comparative example, and it is understood that the first magnetic body 34 can be more effectively magnetized.

Furthermore, as shown by the thick black lined arrows, according to the present embodiment, it can be understood that, as compared with the second comparative example, a situation is avoided in which the fourth magnetic body 48 (at an angular position of 45°) and the fifth magnetic body 49 (at an angular position of 315° (−45°) that are adjacent to the first magnetic body 34 (at an angular position of 0°) are magnetized in a direction opposite to the original magnetizing direction.

Figure 8:
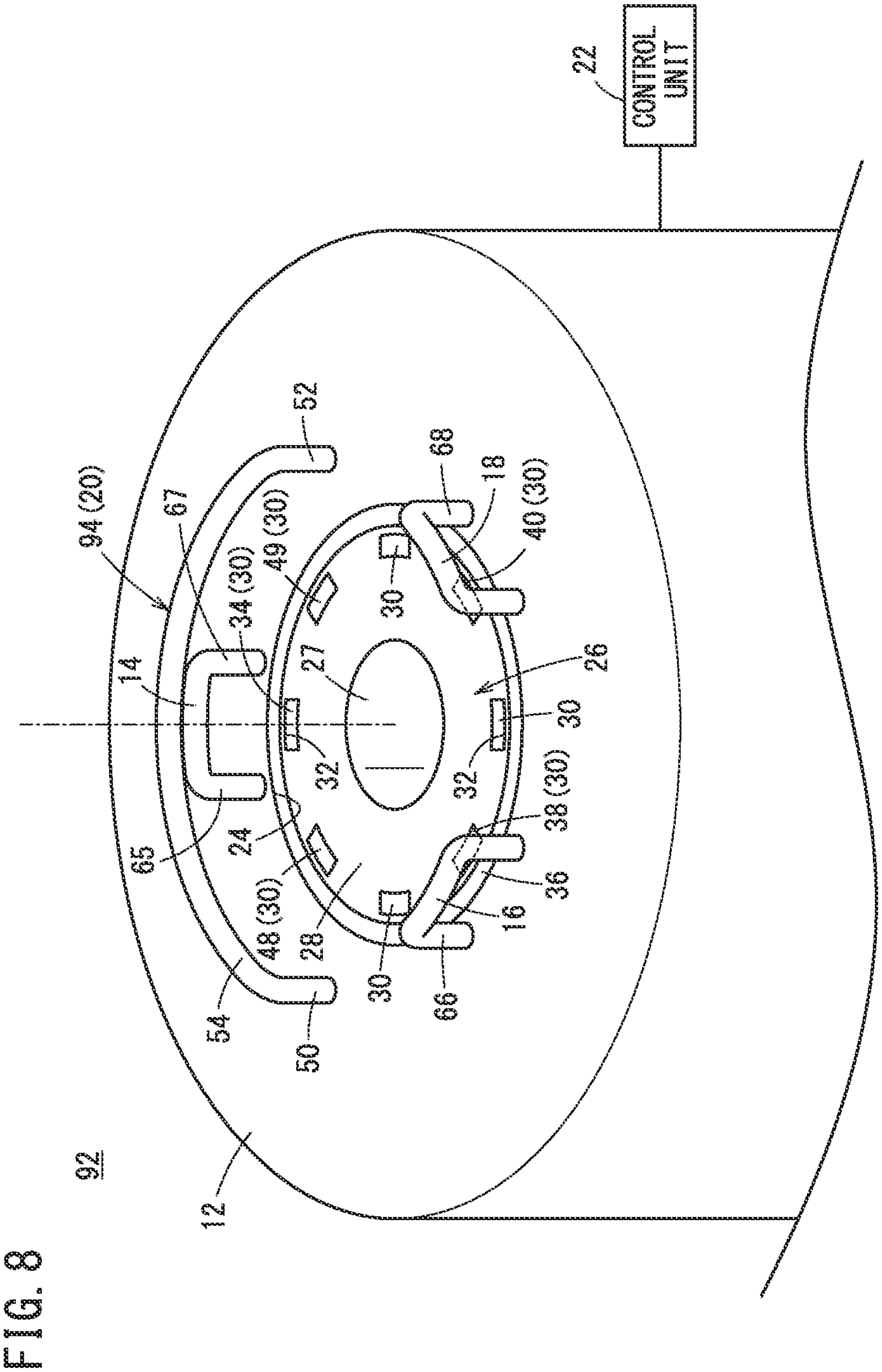
FIG. 8 is a perspective view of a magnetizing device according to a first exemplary modification of the present embodiment.

FIG. 8 is a perspective view of a magnetizing device 92 according to a first exemplary modification of the present embodiment. The magnetizing device 92 differs from the magnetizing device 10 (refer to FIG. 1 to FIG. 3) in that the auxiliary coils 20 are made up of one single auxiliary coil 94.

The auxiliary coil 94 is arranged in the magnetizing yoke 12 in a manner so as to sandwich the first magnetizing coil 14. The auxiliary coil 94 includes the first straight line portion 50, the second straight line portion 52, the first connecting portion 54, and the second connecting portion 56.

Figure 9:
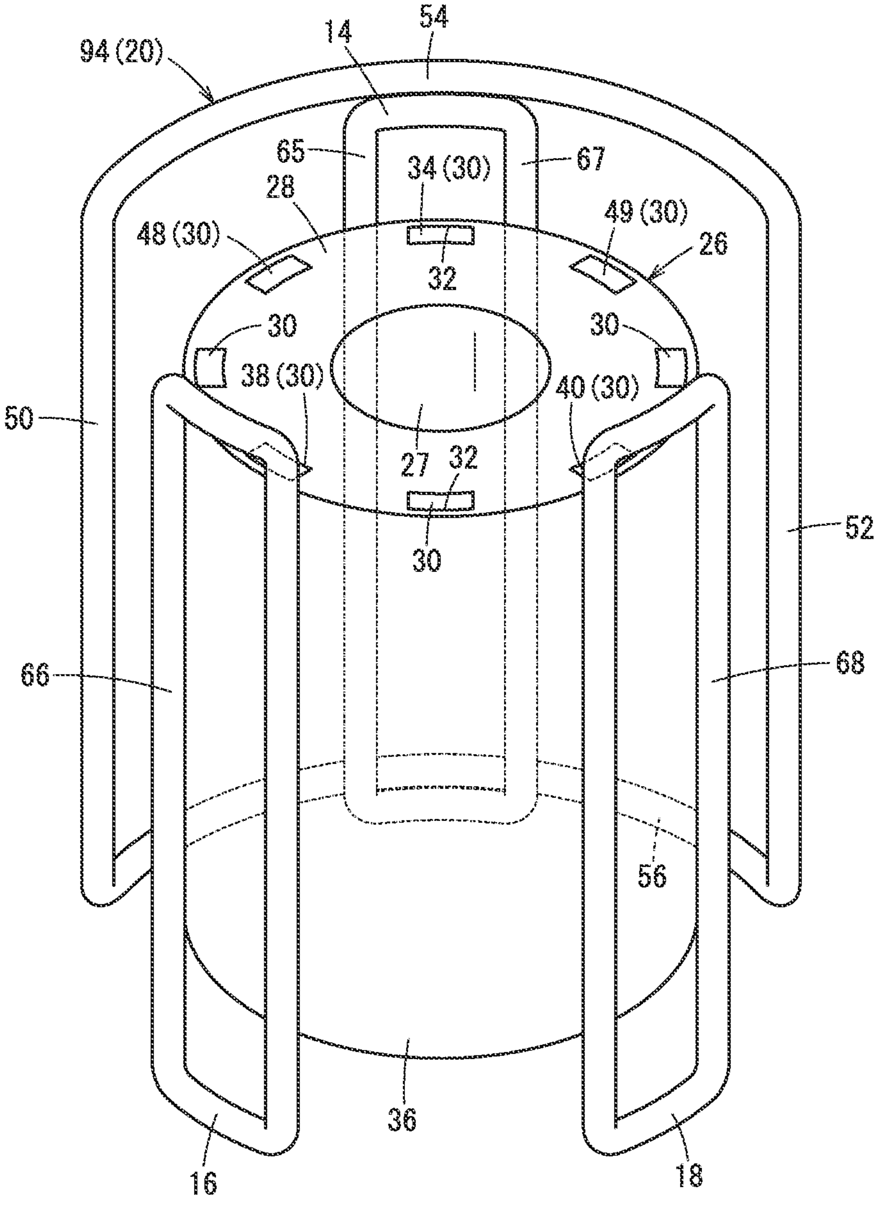
FIG. 9 is a perspective view of a rotor, a first magnetizing coil, a second magnetizing coil, a third magnetizing coil, and an auxiliary coil.
Figure 10:
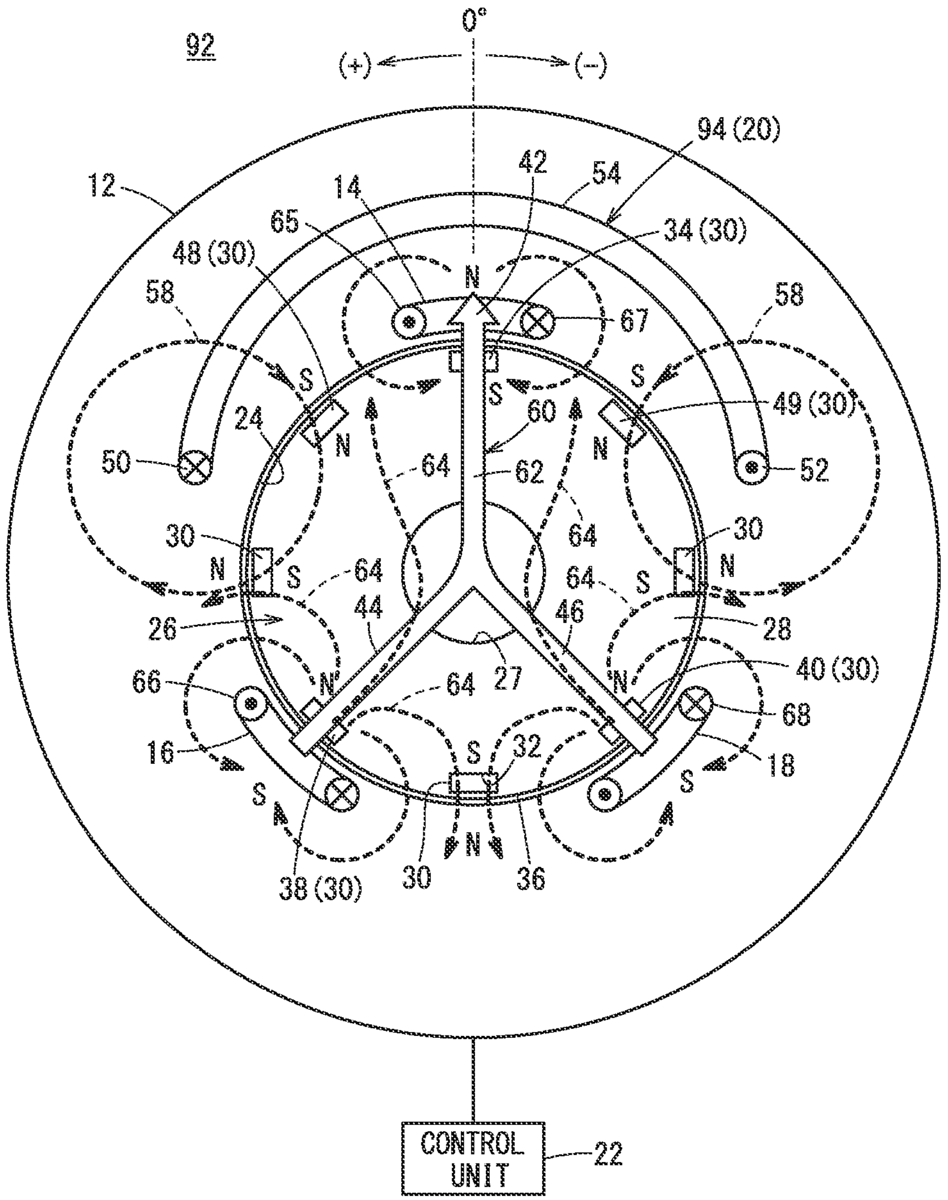
FIG. 10 is a diagram showing a magnetic field distribution of the magnetizing device according to the first exemplary modification of the present embodiment.

The first straight line portion 50 is disposed between the first magnetizing coil 14 and the second magnetizing coil 16. The first straight line portion 50 is arranged at an angular position between the adjacent portion 65 of the first magnetizing coil 14, and the adjacent portion 66 of the second magnetizing coil 16. In FIG. 8 to FIG. 10, the first straight line portion 50 is arranged, within the outer circumferential surface 36 of the rotor 26, in a manner so as to face toward a portion between the fourth magnetic body 48, and the magnetic body 30 that is arranged at an angle of 90° From the first magnetic body 34.

The second straight line portion 52 is disposed between the first magnetizing coil 14 and the third magnetizing coil 18. The second straight line portion 52 is arranged at an angular position between the adjacent portion 67 of the first magnetizing coil 14, and the adjacent portion 68 of the third magnetizing coil 18. In FIG. 8 to FIG. 10, the second straight line portion 52 is arranged, within the outer circumferential surface 36 of the rotor 26, in a manner so as to face toward a portion between the fifth magnetic body 49, and the magnetic body 30 that is arranged at an angle of −90° From the first magnetic body 34.

The auxiliary coil 94, by being supplied with the electrical current from the control unit 22, generates two auxiliary magnetic fields in a manner so as to sandwich the first magnetic field 42 therebetween. In detail, each of the first straight line portion 50 and the second straight line portion 52 generates a diametrical inwardly directed auxiliary magnetic field while the electrical current is supplied from the control unit 22. The intensity of each of the auxiliary magnetic fields is smaller than the intensity of the first magnetic field 42 to the third magnetic field 46. Each of the generated auxiliary magnetic fields is applied to the rotor 26. A diametrical inwardly directed magnetic flux 58 caused by the auxiliary magnetic fields passes through the fourth magnetic body 48 and the fifth magnetic body 49 which are adjacent to the first magnetic body 34 in the circumferential direction with the first magnetic body 34 being sandwiched therebetween.

According to the first exemplary modification, in the magnetizing step, in the first straight line portion 50, an electrical current flows therethrough in a direction opposite to the electrical current flowing through the adjacent portion 65 of the first magnetizing coil 14, and the electrical current flowing through the adjacent portion 66 of the second magnetizing coil 16. Consequently, an auxiliary magnetic field is generated circumferentially around the first straight line portion 50. Due to the auxiliary magnetic field being generated circumferentially around the first straight line portion 50, the diametrical inwardly directed magnetic flux 58 passes through the fourth magnetic body 48 that is adjacent to the first magnetic body 34 along the circumferential direction of the rotor 26. Consequently, the diametrical outwardly directed leakage magnetic flux 64 passes through the interior of the rotor 26 in a manner so as to avoid the fourth magnetic body 48. As a result, it is possible to avoid a situation in which the fourth magnetic body 48 is magnetized in a direction that is opposite to the original magnetizing direction (the direction of the diametrically directed inner side).

Further, according to the first exemplary modification, in the magnetizing step, in the second straight line portion 52, an electrical current flows therethrough in a direction opposite to the electrical current flowing through the adjacent portion 67 of the first magnetizing coil 14, and the electrical current flowing through the adjacent portion 68 of the third magnetizing coil 18. Consequently, an auxiliary magnetic field is generated circumferentially around the second straight line portion 52. Due to the auxiliary magnetic field being generated circumferentially around the second straight line portion 52, the diametrical inwardly directed magnetic flux 58 passes through the fifth magnetic body 49 that is adjacent to the first magnetic body 34 along the circumferential direction of the rotor 26. Consequently, the diametrical outwardly directed leakage magnetic flux 64 passes through the interior of the rotor 26 in a manner so as to avoid the fifth magnetic body 49. As a result, it is possible to avoid a situation in which the fifth magnetic body 49 is magnetized in a direction that is opposite to the original magnetizing direction (the direction of the diametrically directed inner side).

Figure 11:
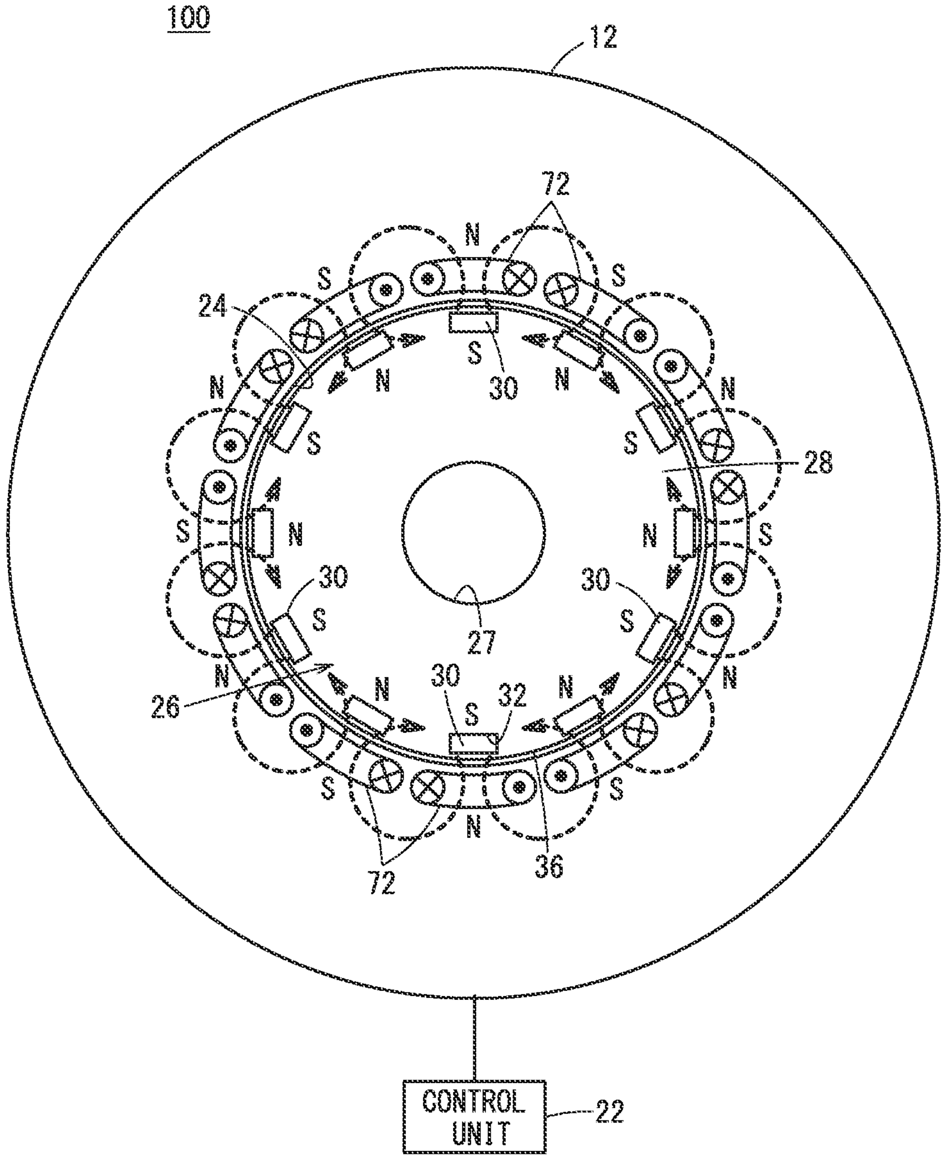
FIG. 11 is a view showing a magnetic field distribution of a magnetizing device according to a third comparative example.
Figure 12:
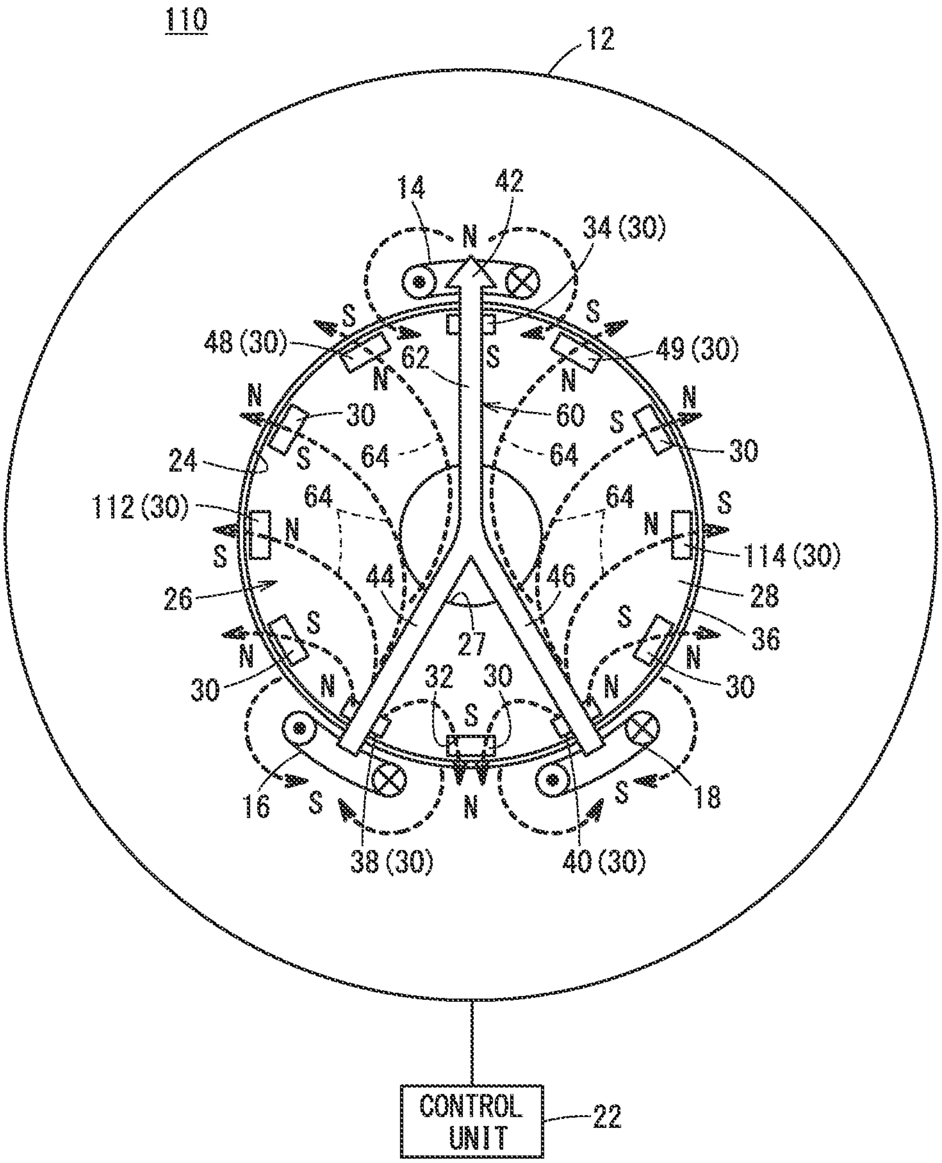
FIG. 12 is a view showing a magnetic field distribution of a magnetizing device according to a fourth comparative example.
Figure 13:
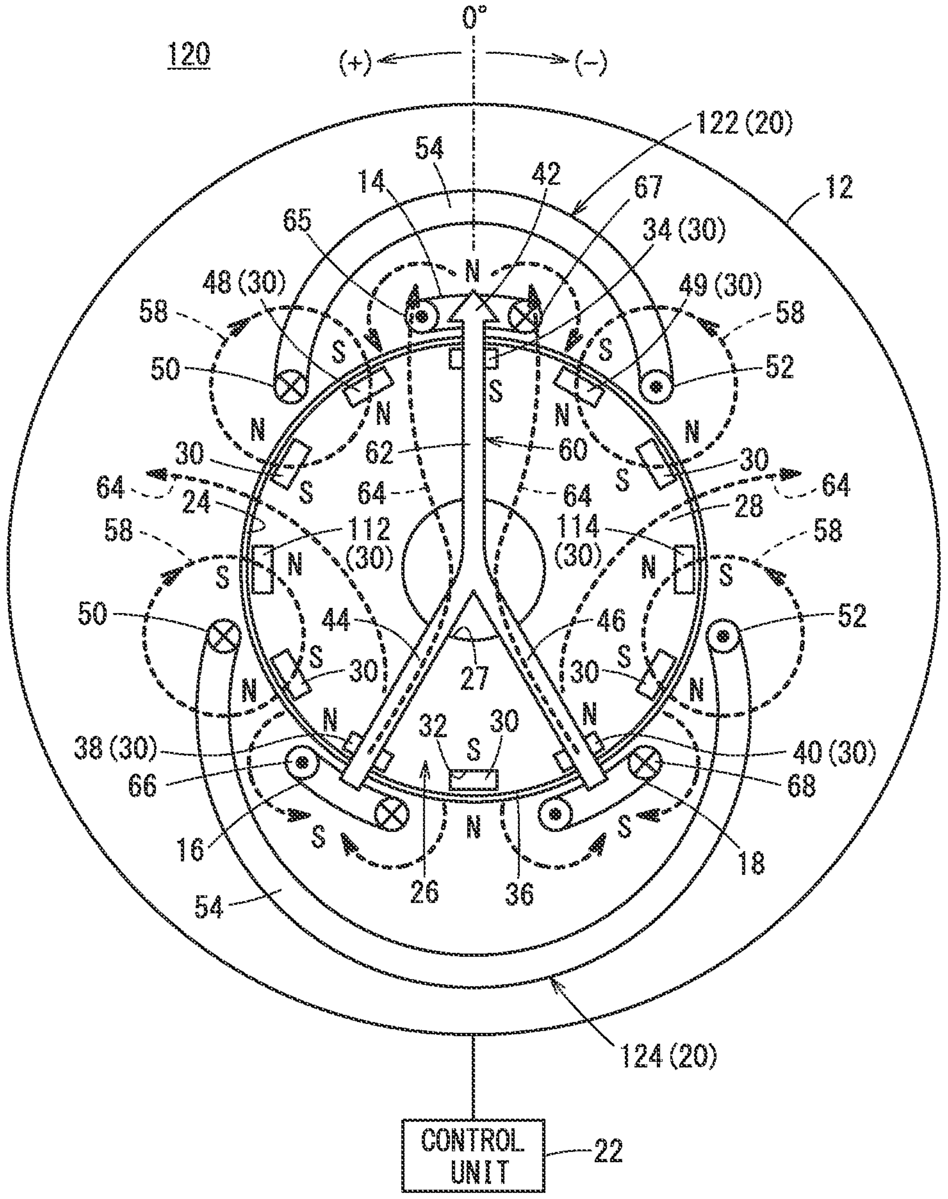
FIG. 13 is a diagram showing a magnetic field distribution of a magnetizing device according to a second exemplary modification of the present embodiment.

FIG. 11 is a view showing a magnetic field distribution of a magnetizing device 100 according to a third comparative example, FIG. 12 is a view showing a magnetic field distribution of a magnetizing device 110 according to a fourth comparative example, and FIG. 13 is a diagram showing a magnetic field distribution of the magnetizing device 120 according to a second exemplary modification of the present embodiment. In the third comparative example, the fourth comparative example, and the second exemplary modification, a case is illustrated in which the rotor 26 having twelve individual magnetic bodies 30 (12 poles) is magnetized. In this case, the twelve individual magnetic bodies 30 are arranged at an interval of 30° in the circumferential direction of the rotor 26.

In the third comparative example shown in FIG. 11, twelve individual magnetizing coils 72 face toward each of the twelve individual magnetic bodies 30. In the third comparative example, the electrical current is supplied simultaneously from the control unit 22 to the twelve individual magnetizing coils 72, and the twelve individual magnetic bodies 30 are magnetized simultaneously. However, in the third comparative example, in a same manner as in the first comparative example (refer to FIG. 5), the magnetic circuit becomes small, and a sufficient magnetic field cannot be applied inwardly of the magnetic bodies 30.

In the fourth comparative example shown in FIG. 12, in the same manner as in the second comparative example (refer to FIG. 6), the auxiliary coils 20 are not provided. In the fourth comparative example, the diametrical outwardly directed leakage magnetic flux 64 that is not drawn in by the first magnetic field 42 passes through the two magnetic bodies 30 (the fourth magnetic body 48 arranged at an angular position of 30° with respect to the first magnetic body 34, and the fifth magnetic body 49 arranged at an angular position of −30° (330°) with respect to the first magnetic body 34) that are adjacent to the first magnetic body 34. Further, in the fourth comparative example, the leakage magnetic flux 64 also passes through the magnetic body 30 (a sixth magnetic body 112) that is arranged at an angle of +90° with respect to the first magnetic body 34, and the magnetic body 30 (a seventh magnetic body 114) that is arranged at an angle of −90° (270°) with respect to the first magnetic body 34. Consequently, in the fourth comparative example, a total of four magnetic bodies 30 (the fourth magnetic body 48, the fifth magnetic body 49, the sixth magnetic body 112, the seventh magnetic body 114) are magnetized in a direction opposite to the original magnetizing direction (the diametrical inward direction).

In contrast thereto, in a magnetizing device 120 according to the second exemplary modification shown in FIG. 13, the auxiliary coils 20 include a first auxiliary coil 122 and a second auxiliary coil 124. In the same manner as in the auxiliary coil 94 of the first exemplary modification shown in FIG. 8, the first auxiliary coil 122 is arranged in a manner so as to sandwich the first magnetizing coil 14. The second auxiliary coil 124 is arranged in a manner so as to sandwich the second magnetizing coil 16 and the third magnetizing coil 18. Moreover, the first auxiliary coil 122 and the second auxiliary coil 124 include the first straight line portion 50, the second straight line portion 52, and the like.

In the second exemplary modification, in addition to the first magnetizing coil 14, the second magnetizing coil 16, and the third magnetizing coil 18, the control unit 22 supplies an electrical current to the first auxiliary coil 122 and the second auxiliary coil 124.

The first auxiliary coil 122 receives the supply of the electrical current from the control unit 22, and generates two first auxiliary magnetic fields that serve as auxiliary magnetic fields. The two first auxiliary magnetic fields are generated circumferentially around the first straight line portion 50 and the second straight line portion 52 of the first auxiliary coil 122, in a manner so as to sandwich the first magnetic field 42 therebetween. A diametrical inwardly directed first auxiliary magnetic field is applied to the fourth magnetic body 48 and the fifth magnetic body 49. Due to the first auxiliary magnetic field, the diametrical inwardly directed magnetic flux 58 passes through the fourth magnetic body 48 and the fifth magnetic body 49. Consequently, the leakage magnetic flux 64 passes through the interior of the rotor 26 in a manner so as to avoid the diametrical inwardly directed magnetic flux 58.

Further, the second auxiliary coil 124 receives the supply of the electrical current from the control unit 22, and generates two second auxiliary magnetic fields that serve as auxiliary magnetic fields. The two second auxiliary magnetic fields are generated circumferentially around the first straight line portion 50 and the second straight line portion 52 of the second auxiliary coil 124. A diametrical inwardly directed second auxiliary magnetic field is applied to the sixth magnetic body 112 and the seventh magnetic body 114. Due to the second auxiliary magnetic field, the diametrical inwardly directed magnetic flux 58 passes through the sixth magnetic body 112 and the seventh magnetic body 114. Consequently, the leakage magnetic flux 64 passes through the interior of the rotor 26 in a manner so as to avoid the diametrical inwardly directed magnetic flux 58.

In this manner, according to the second exemplary modification, the diametrical inwardly directed magnetic flux 58, which is caused by the diametrical inwardly directed first auxiliary magnetic field and the diametrical inwardly directed second magnetic field that are generated circumferentially around the first auxiliary coil 122 and the second auxiliary coil 124, passes through the fourth magnetic body 48, the fifth magnetic body 49, the sixth magnetic body 112, and the seventh magnetic body 114. Consequently, the diametrical outwardly directed leakage magnetic flux 64 passes through the interior of the rotor 26 in a manner so as to avoid the diametrical inwardly directed magnetic flux 58. As a result, it is possible to prevent the fourth magnetic body 48, the fifth magnetic body 49, the sixth magnetic body 112, and the seventh magnetic body 114 from being magnetized in a direction opposite to the original magnetizing direction (the diametrical inward direction).

Figure 14:
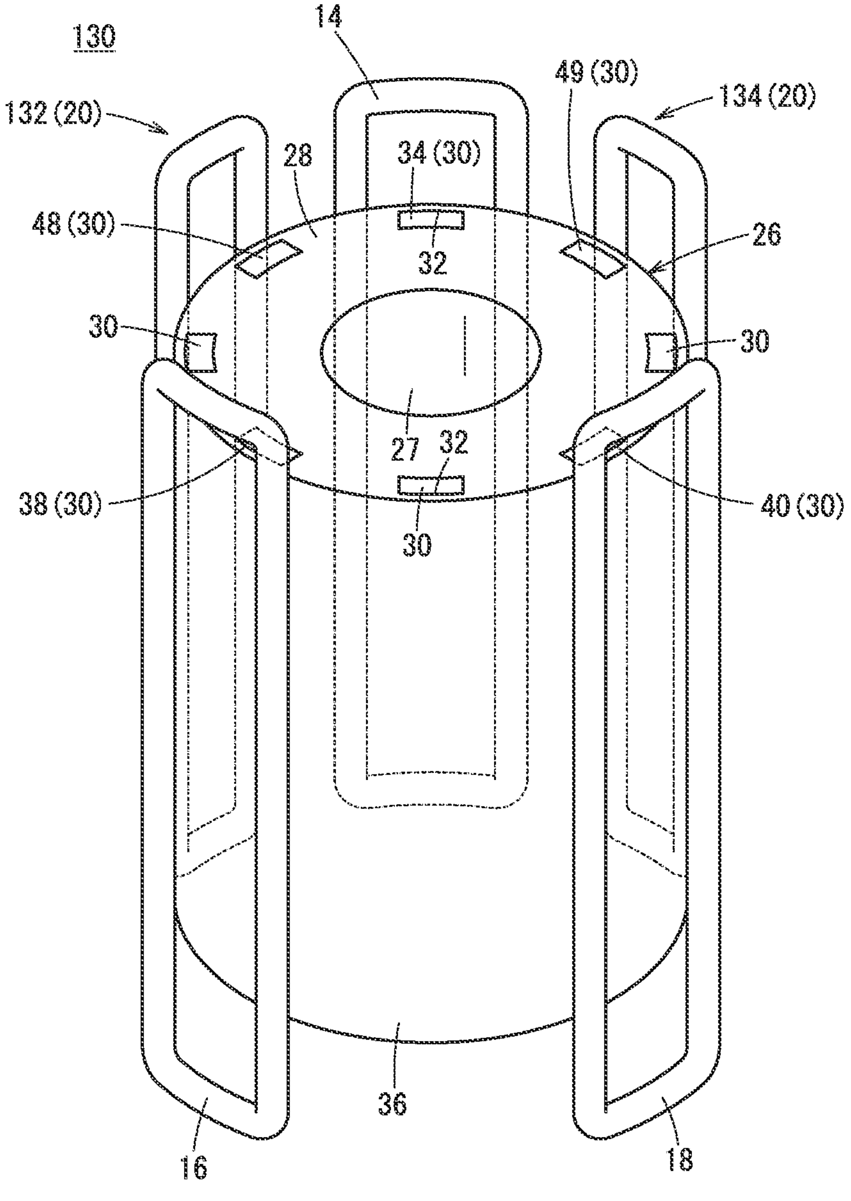
FIG. 14 is a perspective view of a magnetizing device according to a third exemplary modification of the present embodiment.
Figure 15:
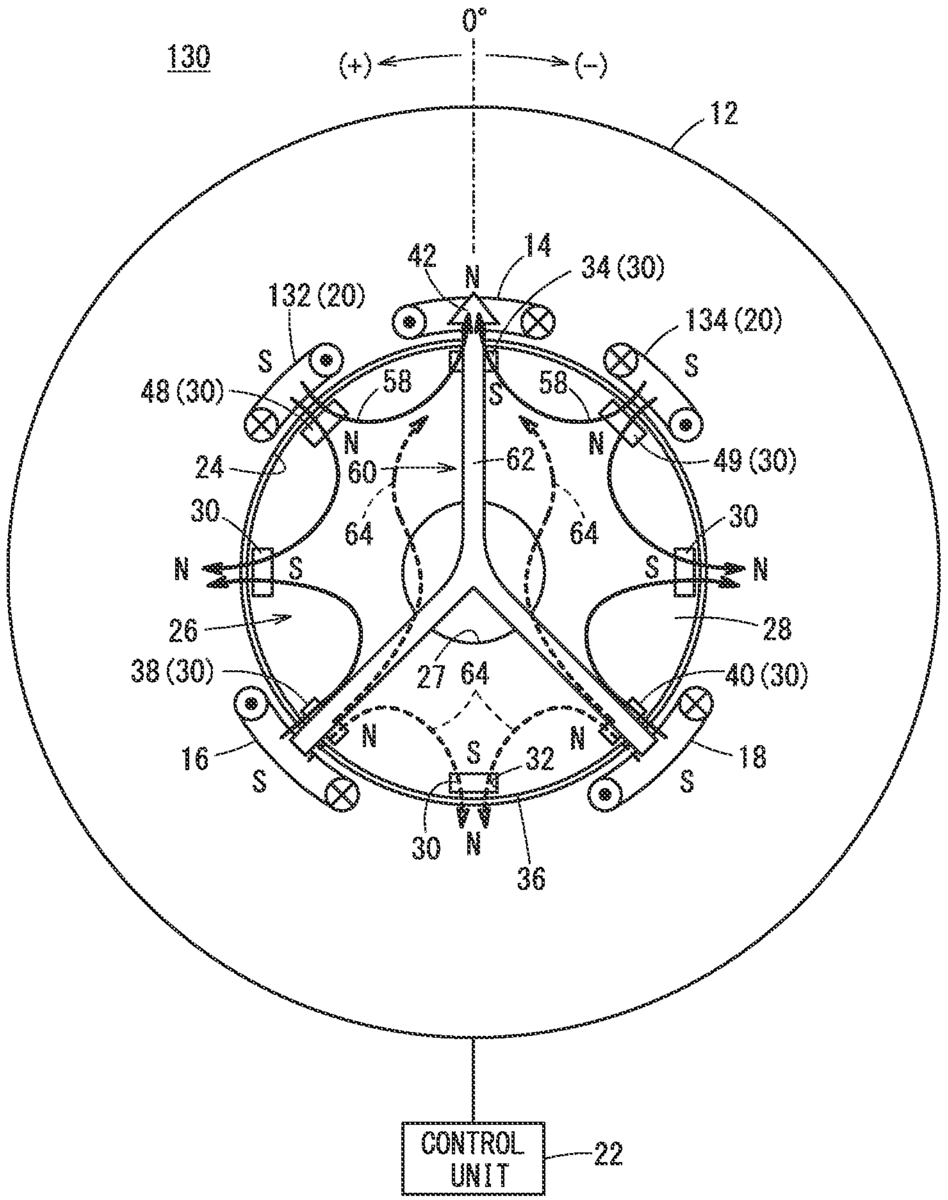
FIG. 15 is a diagram showing a magnetic field distribution of the magnetizing device according to the third exemplary modification of the present embodiment.

FIG. 14 is a perspective view of a magnetizing device 130 according to a third exemplary modification of the present embodiment, and FIG. 15 is a diagram showing a magnetic field distribution of the magnetizing device 130 according to the third exemplary modification. Moreover, it should be noted that, in FIG. 14, illustration of the magnetizing yoke 12 is omitted.

In the third exemplary modification, the auxiliary coils 20 include a first auxiliary coil 132 and a second auxiliary coil 134. In the third exemplary modification, the first auxiliary coil 132 and the second auxiliary coil 134 are arranged in a manner so as to face toward the fourth magnetic body 48 and the fifth magnetic body 49 that are adjacent to the first magnetic body 34. Further, the first auxiliary coil 132 faces toward the fourth magnetic body 48, in a manner so that a central axial line thereof points in the diametrical direction. The second auxiliary coil 134 faces toward the fifth magnetic body 49, in a manner so that a central axial line thereof points in the diametrical direction.

According to the third exemplary modification, at a time when the electrical current is made to flow from the control unit 22 to the first auxiliary coil 132 and the second auxiliary coil 134, a first auxiliary magnetic field is generated circumferentially around the first auxiliary coil 132, and a second auxiliary magnetic field is generated circumferentially around the second auxiliary coil 134. The first auxiliary magnetic field and the second auxiliary magnetic field are diametrical inwardly directed magnetic fields. Due to the first auxiliary magnetic field and the second auxiliary magnetic field being generated, the diametrical inwardly directed magnetic flux 58 passes through the fourth magnetic body 48 and the fifth magnetic body 49. Consequently, since the diametrical outwardly directed leakage magnetic flux 64 passes through the interior of the rotor 26 in a manner so as to avoid the diametrical inwardly directed magnetic flux 58, the fourth magnetic body 48 and the fifth magnetic body 49 can be prevented from being magnetized in a direction opposite to the original magnetizing direction (the diametrical inward direction).

The present embodiment and the first to third exemplary modifications include the following advantageous effects.

As shown in FIG. 3, FIG. 10, FIG. 13, and FIG. 15, in the present embodiment and the first to third exemplary modifications, since the composite magnetic field 62 in which the second magnetic field 44 and the third magnetic field 46 are combined is drawn in by the first magnetic field 42, a high intensity magnetic field reaches the interior of the magnetic bodies 30 of the rotor 26. Consequently, at a low cost, it is possible to magnetize the interior of the magnetic bodies 30. As a result, the magnetizing operation can be carried out efficiently with respect to the plurality of magnetic bodies 30.

Further, at a time when the first magnetic field 42 draws in the composite magnetic field 62 which is a composite of the second magnetic field 44 and the third magnetic field 46, the magnetic flux that is not drawn in by the first magnetic field 42 becomes the diametrical outwardly directed leakage magnetic flux 64. Among the plurality of magnetic bodies 30, there is a possibility that a portion of the magnetic bodies 30 through which the leakage magnetic flux 64 passes may be magnetized in a direction opposite to the original magnetizing direction. Thus, according to the present invention and the first to third exemplary modifications, among the plurality of magnetic bodies 30, the diametrical inwardly directed magnetic flux 58 caused by the auxiliary magnetic fields is made to pass with respect to the magnetic bodies 30 (the fourth magnetic body 48, the fifth magnetic body 49, the sixth magnetic body 112, and the seventh magnetic body 114) which are capable of being magnetized in a direction opposite to the original magnetizing direction. In accordance with this feature, the leakage magnetic flux 64 passes through the interior of the rotor 26 in a manner so as to avoid such magnetic bodies 30. As a result, it is possible to avoid the occurrence of a situation in which the magnetic bodies 30 are magnetized in a direction opposite to the original magnetizing direction.

Therefore, according to the present embodiment and the first to third exemplary modifications, while causing the magnetic body 30 (the first magnetic body 34) in closest proximity to the first magnetizing coil 14 in the interior of the rotor 26 to be concentratedly magnetized, it is possible to suppress a situation in which the other magnetic bodies 30 in the interior of the rotor 26 are magnetized in a direction opposite to the original magnetizing direction due to the leakage magnetic flux 64.

As shown in FIG. 10 and FIG. 13, in the first exemplary modification and the second exemplary modification, an electrical current flowing in an opposite direction to the electrical current flowing in the adjacent portions 65 and 66 adjacent to the first straight line portion 50 within the first magnetizing coil 14 and the second magnetizing coil 16 flows through the first straight line portion 50. Further, an electrical current flowing in an opposite direction to the electrical current flowing in the adjacent portions 67 and 68 adjacent to the second straight line portion 52 within the first magnetizing coil 14 and the third magnetizing coil 18 flows through the second straight line portion 52. Consequently, the diametrical inwardly directed auxiliary magnetic field can be easily generated. As a result, a situation can be efficiently avoided in which the leakage magnetic flux 64 that is not drawn in by the first magnetic field 42 passes through the magnetic bodies 30.

As shown in FIG. 8 to FIG. 10 and FIG. 13, according to the first exemplary modification and the second exemplary modification, two auxiliary magnetic fields are applied to the rotor 26 in a manner so as to sandwich the first magnetic field 42 therebetween. Due to this feature, the leakage magnetic flux 64 that is not drawn in by the first magnetic field 42 passes through the rotor 26 in a manner so as to avoid the two auxiliary magnetic fields. Consequently, it is possible to reliably suppress the occurrence of the magnetic bodies 30 being magnetized in a direction opposite to the original magnetizing direction.

As shown in FIG. 13, according to the second exemplary modification, two first auxiliary magnetic fields are applied to the rotor 26 in a manner so as to sandwich the first magnetic field 42 therebetween, and two second auxiliary magnetic fields are applied to the rotor 26 in a manner so as to sandwich the second magnetic field 44 and the third magnetic field 46 therebetween. Consequently, the leakage magnetic flux 64 that is not drawn in by the first magnetic field 42 passes through the interior of the rotor 26 in a manner so as to avoid the two first auxiliary magnetic fields and the two second auxiliary magnetic fields. As a result, it is possible to reliably suppress the occurrence of magnetic bodies 30 that are magnetized in a direction opposite to the original magnetizing direction.

At a time when the first magnetic body 34 is magnetized in the diametrical outward direction, there is a possibility that the leakage magnetic flux 64 that is not drawn in by the first magnetic field 42 may pass in a diametrical outward direction through the two magnetic bodies 30 (the fourth magnetic body 48 and the fifth magnetic body 49) that are adjacent to the first magnetic body 34, and the two magnetic bodies 30 may be magnetized in a direction opposite to the original magnetizing direction (the diametrical inward direction). Thus, as shown in FIG. 3, FIG. 10, FIG. 13, and FIG. 15, according to the present embodiment and the first to third exemplary modifications, by the diametrical inwardly directed magnetic flux 58 being made to pass through with respect to the two magnetic bodies 30, the leakage magnetic flux 64 passes through the interior of the rotor 26 in a manner so as to avoid the diametrical inwardly directed magnetic flux 58. Consequently, it is possible to reliably suppress a situation in which the two magnetic bodies 30 are magnetized in a direction opposite to the original magnetizing direction.

In relation to the above-described disclosure, the following supplementary notes are further disclosed.

Supplementary Note 1

In the magnetizing device (10, 92, 120, 130) that magnetizes the plurality of magnetic bodies, by applying, with respect to a rotor (26) having the plurality of magnetic bodies (30) arranged in a circumferential direction, the magnetic field in the diametrical direction of the rotor, the magnetizing device comprises the first magnetizing coil (14) arranged in facing relation to the outer circumferential surface (36) of the rotor, and that causes the diametrical outwardly directed first magnetic field (42) to be generated, the second magnetizing coil (16) arranged in facing relation to the outer circumferential surface of the rotor, and that causes the diametrical inwardly directed second magnetic field (44) to be generated, the third magnetizing coil (18) arranged in facing relation to the outer circumferential surface of the rotor, and that causes the diametrical inwardly directed third magnetic field (46) to be generated, and the auxiliary coils (20) arranged in facing relation to the outer circumferential surface of the rotor, and that cause the diametrical inwardly directed auxiliary magnetic field to be generated, wherein, by the first magnetizing coil drawing in with the first magnetic field the composite magnetic field (62) which is a composite of the second magnetic field and the third magnetic field, among the plurality of magnetic bodies, at least a magnetic body (34, 38, 40) through which the first magnetic field, the second magnetic field, or the third magnetic field passes is magnetized in a magnetizing direction along the diametrical direction, among the magnetic fluxes caused by the second magnetic field and the third magnetic field, a magnetic flux that is not drawn in by the first magnetic field is the diametrical outwardly directed leakage magnetic flux (64), and by the auxiliary coil applying the auxiliary magnetic field to the rotor, among the plurality of magnetic bodies, in the case it is assumed that the auxiliary magnetic field is not present therein, the diametrical inwardly directed magnetic flux (58) caused by the auxiliary magnetic field is made to pass with respect to a magnetic body for which there is a possibility of the magnetic body being magnetized in a direction opposite to a direction in which the magnetic body should be magnetized due to the passage of the leakage magnetic flux.

According to the present invention, since the composite magnetic field in which the second magnetic field and the third magnetic field are combined is drawn in by the first magnetic field, a high intensity magnetic field reaches to the interior of the magnetic bodies of the rotor. Consequently, at a low cost, it is possible to magnetize the interior of the magnetic bodies. As a result, the magnetizing operation can be carried out efficiently with respect to the plurality of magnetic bodies.

Further, at a time when the first magnetic field draws in the composite magnetic field which is a composite of the second magnetic field and the third magnetic field, the magnetic flux that is not drawn in by the first magnetic field becomes the diametrical outwardly directed leakage magnetic flux. Among the plurality of magnetic bodies, there is a possibility that a portion of the magnetic bodies through which the leakage magnetic flux passes may be magnetized in a direction opposite to the original magnetizing direction. Thus, according to the present invention, among the plurality of magnetic bodies, the diametrical inwardly directed magnetic flux caused by the auxiliary magnetic field is made to pass with respect to the magnetic bodies that are capable of being magnetized in a direction opposite to the original magnetizing direction. In accordance with this feature, the leakage magnetic flux passes through the interior of the rotor in a manner so as to avoid such magnetic bodies. As a result, it is possible to avoid the occurrence of magnetic bodies that are magnetized in a direction opposite to the original magnetizing direction.

Therefore, according to the present invention, while causing the magnetic body in closest proximity to the first magnetizing coil in the interior of the rotor to be concentratedly magnetized, it is possible to suppress a situation in which the other magnetic bodies in the interior of the rotor are magnetized in a direction opposite to the original magnetizing direction due to the leakage magnetic flux.

Supplementary Note 2

In the magnetizing device according to supplementary note 1, by the first magnetizing coil drawing in with the first magnetic field the composite magnetic field, among the plurality of magnetic bodies, the first magnetic body (34) facing in the diametrical direction toward the first magnetizing coil may be magnetized in the diametrical outward direction, the second magnetic body (38) facing in the diametrical direction toward the second magnetizing coil may be magnetized in the diametrical inward direction, and the third magnetic body (40) facing in the diametrical direction toward the third magnetizing coil may be magnetized in the diametrical inward direction, the fourth magnetic body (48) may be arranged between the first magnetic body and the second magnetic body along the circumferential direction, the fifth magnetic body (49) may be arranged between the first magnetic body and the third magnetic body along the circumferential direction, the auxiliary coil may comprise the first auxiliary coil (45) arranged between the first magnetizing coil and the second magnetizing coil, and the central axis of which is oriented in a direction tangential to the outer circumferential surface of the rotor, and the second auxiliary coil (47) may be arranged between the first magnetizing coil and the third magnetizing coil, and the central axis of which is oriented in a direction tangential to the outer circumferential surface of the rotor, wherein, with respect to the fourth magnetizing body, the first auxiliary coil may cause passage of a diametrical inwardly directed magnetic flux caused by the first auxiliary magnetic field which is the auxiliary magnetic field, and with respect to the fifth magnetizing body, the second auxiliary coil may cause passage of a diametrical inwardly directed magnetic flux caused by the second auxiliary magnetic field which is the auxiliary magnetic field.

With respect to the fourth magnetic body, the first auxiliary coil causes passage of a diametrical inwardly directed magnetic flux caused by the first auxiliary magnetic field, and with respect to the fifth magnetic body, the second auxiliary coil causes passage of a diametrical inwardly directed magnetic flux caused by the second auxiliary magnetic field. Consequently, a situation can be reliably avoided in which the leakage magnetic flux that is not drawn in by the first magnetic field passes through the fourth magnetic body and the fifth magnetic body.

Supplementary Note 3

In the magnetizing device according to supplementary note 2, the plurality of magnetic bodies may each extend respectively in the axial direction of the rotor, and each of the first auxiliary coil and the second auxiliary coil may include the first straight line portion (50) extending in the axial direction, the second straight line portion (52) arranged to be spaced apart in the diametrical direction with respect to the first straight line portion, and which extends in the axial direction, the first connecting portion (54) extending in the diametrical direction, and connecting one end of the first straight line portion and one end of the second straight line portion, and the second connecting portion (56) extending in the diametrical direction, and connecting another end of the first straight line portion and another end of the second straight line portion, wherein the length of the first connecting portion and the length of the second connecting portion along the diametrical direction may be shorter than the length of the first straight line portion and the length of the second straight line portion along the axial direction.

Since the length of the first connecting portion and the length of the second connecting portion along the circumferential direction are shorter than the length of the first straight line portion and the length of the second straight line portion along the axial direction, the total length of the first auxiliary coil and the second auxiliary coil can be made shorter.

Supplementary Note 4

In the magnetizing device according to supplementary note 1, the auxiliary coil may comprise the first straight line portion (50) disposed between the first magnetizing coil and the second magnetizing coil, and extending in the axial direction of the rotor, the second straight line portion (52) disposed between the first magnetizing coil and the third magnetizing coil, and extending in the axial direction of the rotor, the first connecting portion (54) connecting one end of the first straight line portion and one end of the second straight line portion, and the second connecting portion (56) connecting another end of the first straight line portion and another end of the second straight line portion, the electrical current flowing through the portion (65) adjacent to the first straight line portion within the first magnetizing coil, and the electrical current flowing in an opposite direction to the electrical current flowing through the portion (66) adjacent to the first straight line portion within the second magnetizing coil may flow through the first straight line portion, and the electrical current flowing through the portion (67) adjacent to the second straight line portion within the first magnetizing coil, and the electrical current flowing in an opposite direction to the electrical current flowing through the portion (68) adjacent to the second straight line portion within the third magnetizing coil may flow through the second straight line portion.

The electrical current flowing in the opposite direction to the electrical current flowing through the portion adjacent to the first straight line portion within the first magnetizing coil and the second magnetizing coil flows through the first straight line portion, and together therewith, the electrical current flowing in the opposite direction to the electrical current flowing through the portion adjacent to the second straight line portion within the first magnetizing coil and the third magnetizing coil flows through the second straight line portion. Consequently, the diametrical inwardly directed auxiliary magnetic field can be easily generated. As a result, a situation can be efficiently avoided in which the leakage magnetic flux that is not drawn in by the first magnetic field passes through the magnetic bodies.

Supplementary Note 5

In the magnetizing device according to supplementary note 1 or supplementary note 4, the auxiliary coil may be arranged in a manner so as to sandwich the first magnetizing coil, and may apply two of the auxiliary magnetic fields to the rotor in a manner so as to sandwich the first magnetic field therebetween.

Since the two auxiliary magnetic fields are applied to the rotor in a manner so as to sandwich the first magnetic field therebetween, the leakage magnetic flux that is not drawn in by the first magnetic field passes through the interior of the rotor in a manner so as to avoid the two auxiliary magnetic fields. Consequently, it is possible to reliably suppress the occurrence of magnetic bodies that are magnetized in a direction opposite to the original magnetizing direction.

Supplementary Note 6

In the magnetizing device according to supplementary note 1, the auxiliary coil may include the first auxiliary coil (122) arranged in a manner so as to sandwich the first magnetizing coil, and the second auxiliary coil (124)

arranged in a manner so as to sandwich the second magnetizing coil and the third magnetizing coil, the first auxiliary coil may apply to the rotor the two first auxiliary magnetic fields, which are the auxiliary magnetic fields, in a manner so as to sandwich the first magnetic field, and the first auxiliary coil may apply to the rotor the two second auxiliary magnetic fields, which are the auxiliary magnetic fields, in a manner so as to sandwich the first magnetic field.

The two first auxiliary magnetic fields are applied to the rotor in a manner so as to sandwich the first magnetic field, and together therewith, the two second auxiliary magnetic fields are applied to the rotor in a manner so as to sandwich the second magnetic field and the third magnetic field. Consequently, the leakage magnetic flux that is not drawn in by the first magnetic field passes through the interior of the rotor in a manner so as to avoid the two first auxiliary magnetic fields and the two second auxiliary magnetic fields. As a result, it is possible to reliably suppress the occurrence of magnetic bodies that are magnetized in a direction opposite to the original magnetizing direction.

Supplementary Note 7

In the magnetizing device according to any one of supplementary notes 1 to 6, the plurality of magnetic bodies may be magnetized respectively in a manner so that the magnetic bodies that are adjacent to each other in the circumferential direction are magnetized in different directions, by the first magnetizing coil drawing in the composite magnetic field with the first magnetic field, among the plurality of magnetic bodies, the first magnetic body (34) facing in the diametrical direction toward the first magnetizing coil may be magnetized in a diametrical outward direction, and by the auxiliary magnetic field being applied to the rotor, from among the plurality of magnetic bodies, the auxiliary coil may cause the diametrical inwardly directed magnetic flux caused by the auxiliary magnetic field to pass through with respect to two magnetic bodies (48, 49) that are adjacent to the first magnetic body while sandwiching the first magnetic body therebetween.

At the time when the first magnetic body is magnetized in the diametrical outward direction, there is a possibility that the leakage magnetic flux that is not drawn in by the first magnetic field may pass in a diametrical outward direction through the two magnetic bodies that are adjacent to the first magnetic body, and the two magnetic bodies may be magnetized in a direction opposite to the original magnetizing direction (the diametrical inward direction). Therefore, by the diametrical inwardly directed magnetic flux being made to pass through with respect to the two magnetic bodies, the leakage magnetic flux passes through the interior of the rotor while avoiding the diametrical inwardly directed magnetic flux. Consequently, it is possible to reliably suppress a situation in which the two magnetic bodies are magnetized in a direction opposite to the original magnetizing direction.

Supplementary Note 8

In the magnetizing device according to any one of supplementary notes 1 to 7, the magnitude of the auxiliary magnetic fields may be smaller than the magnitude of the first magnetic field, the second magnetic field, and the third magnetic field.

By having the magnitude of the auxiliary magnetic fields be smaller than the magnitude of the first magnetic field, the second magnetic field, and the third magnetic field, without disturbing the magnetizing operation with respect to the first magnetic body to the third magnetic body, it is possible to suppress a situation in which the other magnetic bodies are magnetized in a direction opposite to the original magnetizing direction due to the leakage magnetic flux that is not drawn in by the first magnetic field.

Supplementary Note 9

In the magnetizing method of magnetizing the plurality of magnetic bodies, by applying, with respect to the rotor having the plurality of magnetic bodies arranged in a circumferential direction, the magnetic field in the diametrical direction of the rotor, the magnetizing method comprises the arrangement step (step S1) of arranging the first magnetizing coil, the second magnetizing coil, the third magnetizing coil, and the auxiliary coil in facing relation to the outer circumferential surface of the rotor, and the magnetizing step (step S2) in which, by causing the diametrical outwardly directed first magnetic field to be generated, causing the diametrical inwardly directed second magnetic field to be generated, and causing the diametrical inwardly directed third magnetic field to be generated, and by the first magnetizing coil drawing in with the first magnetic field the composite magnetic field which is a composite of the second magnetic field and the third magnetic field, among the plurality of magnetic bodies, the first magnetic body facing toward the first magnetizing coil is magnetized in the diametrical outward direction, the second magnetic body facing toward the second magnetizing coil is magnetized in the diametrical inward direction, and the third magnetic body facing toward the third magnetizing coil is magnetized in the diametrical inward direction, in the magnetizing step, among the magnetic fluxes caused by the second magnetic field and the third magnetic field, the magnetic flux that is not drawn in by the first magnetic field is the diametrical outwardly directed leakage magnetic flux, and by the auxiliary coil applying the diametrical inwardly directed auxiliary magnetic field to the rotor, among the plurality of magnetic bodies, in the case it is assumed that the auxiliary magnetic field is not present therein, the diametrical inwardly directed magnetic flux caused by the auxiliary magnetic field is made to pass with respect to a magnetic body for which there is a possibility of the magnetic body being magnetized in a direction opposite to a direction in which the magnetic body should be magnetized due to the passage of the leakage magnetic flux.

According to the present invention, since the composite magnetic field in which the second magnetic field and the third magnetic field are combined is drawn in by the first magnetic field, a high intensity magnetic field reaches to the interior of the magnetic bodies of the rotor. Consequently, at a low cost, it is possible to magnetize the interior of the magnetic bodies. As a result, the magnetizing operation can be carried out efficiently with respect to the plurality of magnetic bodies.

Further, at a time when the first magnetic field draws in the composite magnetic field which is a composite of the second magnetic field and the third magnetic field, the magnetic flux that is not drawn in by the first magnetic field becomes the diametrical outwardly directed leakage magnetic flux. Among the plurality of magnetic bodies, there is a possibility that a portion of the magnetic bodies through which the leakage magnetic flux passes may be magnetized in a direction opposite to the original magnetizing direction. Thus, according to the present invention, among the plurality of magnetic bodies, the diametrical inwardly directed magnetic flux caused by the auxiliary magnetic field is made to pass with respect to the magnetic bodies that are capable of being magnetized in a direction opposite to the original magnetizing direction. In accordance with this feature, the leakage magnetic flux passes through the interior of the rotor in a manner so as to avoid such magnetic bodies. As a result, it is possible to avoid the occurrence of magnetic bodies that are magnetized in a direction opposite to the original magnetizing direction.

Therefore, according to the present invention, while causing the magnetic body in closest proximity to the first magnetizing coil in the interior of the rotor to be concentratedly magnetized, it is possible to suppress a situation in which the other magnetic bodies in the interior of the rotor are magnetized in a direction opposite to the original magnetizing direction due to the leakage magnetic flux.

It should be noted that the present invention is not limited to the features described above, and various configurations can be adopted therein without departing from the essence and gist of the present invention.

What is claimed is:

1. A magnetizing device configured to magnetize a plurality of magnetic bodies, by applying, with respect to a rotor having a plurality of magnetic bodies arranged in a circumferential direction, a magnetic field in a diametrical direction of the rotor, the magnetizing device comprising:

a first magnetizing coil arranged in facing relation to an outer circumferential surface of the rotor, and configured to generate a diametrical outwardly directed first magnetic field;

a second magnetizing coil arranged in facing relation to the outer circumferential surface of the rotor, and configured to generate a diametrical inwardly directed second magnetic field;

a third magnetizing coil arranged in facing relation to the outer circumferential surface of the rotor, and configured to generate a diametrical inwardly directed third magnetic field; and an auxiliary coil arranged in facing relation to the outer circumferential surface of the rotor, and configured to generate a diametrical inwardly directed auxiliary magnetic field;

wherein, by the first magnetizing coil drawing in with the first magnetic field a composite magnetic field which is a composite of the second magnetic field and the third magnetic field, among the plurality of magnetic bodies, at least a magnetic body through which the first magnetic field, the second magnetic field, or the third magnetic field passes is magnetized in a magnetizing direction along the diametrical direction;

among magnetic fluxes caused by the second magnetic field and the third magnetic field, a magnetic flux that is not drawn in by the first magnetic field is a diametrical outwardly directed leakage magnetic flux; and the auxiliary coil applies the auxiliary magnetic field to the rotor, whereby a diametrical inwardly directed magnetic flux caused by the auxiliary magnetic field is made to pass with respect to another magnetic body different from the magnetic body magnetized by the first magnetic field, the second magnetic field, or the third magnetic field among the plurality of magnetic bodies, in order to prevent the another magnetic body from being magnetized, due to the passage of the leakage magnetic flux, in a direction opposite to a direction in which the another magnetic body should be magnetized.

2. The magnetizing device according to claim 1, wherein:

the first magnetizing coil drawing in a composite magnetic field with the first magnetic field, whereby among the plurality of magnetic bodies, a first magnetic body facing in the diametrical direction toward the first magnetizing coil is magnetized in a diametrical outward direction, a second magnetic body facing in the diametrical direction toward the second magnetizing coil is magnetized in a diametrical inward direction, and a third magnetic body facing in the diametrical direction toward the third magnetizing coil is magnetized in a diametrical inward direction;

a fourth magnetic body is arranged between the first magnetic body and the second magnetic body along the circumferential direction;

a fifth magnetic body is arranged between the first magnetic body and the third magnetic body along the circumferential direction;

the auxiliary coil comprises:

a first auxiliary coil arranged between the first magnetizing coil and the second magnetizing coil, and a central axis of which is oriented in a direction tangential to the outer circumferential surface of the rotor; and a second auxiliary coil arranged between the first magnetizing coil and the third magnetizing coil, and a central axis of which is oriented in a direction tangential to the outer circumferential surface of the rotor;

wherein, with respect to the fourth magnetizing body, the first auxiliary coil causes passage of a diametrical inwardly directed magnetic flux caused by a first auxiliary magnetic field which is the auxiliary magnetic field; and with respect to the fifth magnetizing body, the second auxiliary coil causes passage of a diametrical inwardly directed magnetic flux caused by a second auxiliary magnetic field which is the auxiliary magnetic field.

3. The magnetizing device according to claim 2, wherein:

the plurality of magnetic bodies each extend respectively in an axial direction of the rotor; and each of the first auxiliary coil and the second auxiliary coil includes:

a first straight line portion extending in the axial direction;

a second straight line portion arranged to be spaced apart in the diametrical direction with respect to the first straight line portion, and extending in the axial direction;

a first connecting portion extending in the diametrical direction, and connecting one end of the first straight line portion and one end of the second straight line portion; and a second connecting portion extending in the diametrical direction, and connecting another end of the first straight line portion and another end of the second straight line portion;

wherein a length of the first connecting portion and a length of the second connecting portion along the diametrical direction is shorter than a length of the first straight line portion and a length of the second straight line portion along the axial direction.

4. The magnetizing device according to claim 1, wherein the auxiliary coil comprises:

a first straight line portion disposed between the first magnetizing coil and the second magnetizing coil, and extending in an axial direction of the rotor;

a second straight line portion disposed between the first magnetizing coil and the third magnetizing coil, and extending in the axial direction of the rotor;

a first connecting portion connecting one end of the first straight line portion and one end of the second straight line portion; and a second connecting portion connecting another end of the first straight line portion and another end of the second straight line portion;

an electrical current flowing through the first straight line portion flows in an opposite direction to an electrical current flowing through a portion adjacent to the first straight line portion within the first magnetizing coil and to an electrical current flowing through a portion adjacent to the first straight line portion within the second magnetizing coil; and an electrical current flowing through the second straight line portion flows in an opposite direction to an electrical current flowing through a portion adjacent to the second straight line portion within the first magnetizing coil and to an electrical current flowing through a portion adjacent to the second straight line portion within the third magnetizing coil.

5. The magnetizing device according to claim 1, wherein the auxiliary coil is arranged in a manner so as to sandwich the first magnetizing coil, and applies two of the auxiliary magnetic fields to the rotor in a manner so as to sandwich the first magnetic field therebetween.

6. The magnetizing device according to claim 1, wherein:

the auxiliary coil includes a first auxiliary coil arranged in a manner so as to sandwich the first magnetizing coil, and a second auxiliary coil arranged in a manner so as to sandwich the second magnetizing coil and the third magnetizing coil;

the first auxiliary coil applies to the rotor two first auxiliary magnetic fields, which are the auxiliary magnetic fields, in a manner so as to sandwich the first magnetic field; and the second auxiliary coil applies to the rotor two second auxiliary magnetic fields, which are the auxiliary magnetic fields, in a manner so as to sandwich the second magnetic field and the third magnetic field.

7. The magnetizing device according to claim 1, wherein:

the plurality of magnetic bodies are magnetized respectively in a manner so that magnetic bodies that are adjacent to each other in the circumferential direction are magnetized in different directions;

by the first magnetizing coil drawing in the composite magnetic field with the first magnetic field, among the plurality of magnetic bodies, a first magnetic body facing in the diametrical direction toward the first magnetizing coil is magnetized in a diametrical outward direction;

the auxiliary coil applies the auxiliary magnetic field to the rotor, whereby the diametrical inwardly directed magnetic flux caused by the auxiliary magnetic field is made to pass with respect to, among the plurality of magnetic bodies, at least two magnetic bodies that are adjacent to the first magnetic body in the circumferential direction while sandwiching the first magnetic body therebetween.

8. The magnetizing device according to claim 1, wherein the magnitude of the auxiliary magnetic field is smaller than the magnitude of the first magnetic field, the second magnetic field, and the third magnetic field.

9. A magnetizing method of magnetizing a plurality of magnetic bodies, by applying, with respect to a rotor having a plurality of magnetic bodies arranged in a circumferential direction, a magnetic field in a diametrical direction of the rotor, the magnetizing method comprising:

an arrangement step of arranging a first magnetizing coil, a second magnetizing coil, a third magnetizing coil, and an auxiliary coil in facing relation to an outer circumferential surface of the rotor; and a first magnetic field generation step of generating a diametrical outwardly directed first magnetic field with the first magnetizing coil, a second magnetic field generation step of generating a diametrical inwardly directed second magnetic field with the second magnetizing coil, a third magnetic field generation step of generating a diametrical inwardly directed third magnetic field with the third magnetizing coil, and a magnetizing step of magnetizing, by the first magnetizing coil drawing in with the first magnetic field a composite magnetic field that is a composite of the second magnetic field and the third magnetic field, among the plurality of magnetic bodies, at least a magnetic body through which the first magnetic field, the second magnetic field, or the third magnetic field passes in a magnetizing direction along the diametrical direction;

in the magnetizing step:

among magnetic fluxes caused by the second magnetic field and the third magnetic field, a magnetic flux that is not drawn in by the first magnetic field is a diametrical outwardly directed leakage magnetic flux; and the auxiliary coil applies a diametrical inwardly directed auxiliary magnetic field to the rotor, whereby a diametrical inwardly directed magnetic flux caused by the auxiliary magnetic field is made to pass with respect to another magnetic body different from the magnetic body magnetized by the first magnetic field, the second magnetic field, or the third magnetic field among the plurality of magnetic bodies, in order to prevent the another magnetic body from being magnetized, due to the passage of the leakage magnetic flux, in a direction opposite to a direction in which the another magnetic body should be magnetized.

* * * * *